US009367865B2

(12) United States Patent
Treiser et al.

(10) Patent No.: US 9,367,865 B2
(45) Date of Patent: Jun. 14, 2016

(54) SYSTEM AND METHOD FOR PROVIDING CONSUMERS WITH ACCESS TO AN ARTICLE WHILE PREVENTING THEFT THEREOF

(71) Applicants: Adam Phillip Treiser, Washington, DC (US); Michael Burns, Margate, NJ (US)

(72) Inventors: Adam Phillip Treiser, Washington, DC (US); Michael Burns, Margate, NJ (US)

(*) Notice: Subject to any disclaimer, the term of this patent is extended or adjusted under 35 U.S.C. 154(b) by 422 days.

(21) Appl. No.: 13/935,242

(22) Filed: Jul. 3, 2013

(65) Prior Publication Data
US 2014/0019241 A1 Jan. 16, 2014

Related U.S. Application Data

(60) Provisional application No. 61/667,684, filed on Jul. 3, 2012.

(51) Int. Cl.
G08B 13/14 (2006.01)
G06Q 30/06 (2012.01)
G06Q 10/00 (2012.01)

(52) U.S. Cl.
CPC ........ *G06Q 30/0609* (2013.01); *G06K 2207/00* (2013.01); *G06Q 10/00* (2013.01)

(58) Field of Classification Search
CPC .......................... G06Q 10/00; G06K 2207/00
See application file for complete search history.

(56) References Cited

U.S. PATENT DOCUMENTS

| 6,595,342 | B1 | 7/2003 | Maritzen et al. |
| 8,368,536 | B2 | 2/2013 | Fawcett et al. |
| 8,401,915 | B1 | 3/2013 | Kim |
| 2004/0002897 | A1* | 1/2004 | Vishik .................. G06Q 30/02 705/14.51 |
| 2005/0209921 | A1 | 9/2005 | Roberts et al. |
| 2008/0140509 | A1* | 6/2008 | Amjadi ................. G06Q 30/02 705/14.1 |
| 2010/0082447 | A1 | 4/2010 | Lin et al. |
| 2011/0082729 | A1 | 4/2011 | Carvallo et al. |
| 2012/0271712 | A1 | 10/2012 | Katzin et al. |
| 2012/0271715 | A1 | 10/2012 | Morton et al. |
| 2012/0296770 | A1 | 11/2012 | Lin et al. |
| 2013/0012126 | A1 | 1/2013 | Fisher et al. |
| 2013/0024308 | A1 | 1/2013 | Ramaswamy et al. |
| 2013/0046648 | A1 | 2/2013 | Calman et al. |
| 2013/0059534 | A1 | 3/2013 | Sobalvarro et al. |
| 2013/0061261 | A1 | 3/2013 | Pakula |
| 2013/0080278 | A1 | 3/2013 | Daily |
| 2013/0095755 | A1 | 4/2013 | Moreton et al. |
| 2013/0132279 | A1 | 5/2013 | Nordstrom |
| 2013/0144757 | A1 | 6/2013 | Bauer et al. |

* cited by examiner

Primary Examiner — Shirley Lu
(74) Attorney, Agent, or Firm — The Belles Group, P.C.

(57) ABSTRACT

The present invention is directed to a system and method for providing consumers with access to an article while preventing theft thereof. In one aspect, the invention is a method for providing consumers with access to an article, the method comprising: a) securing the article in a secured state using an anti-theft system, the anti-theft system alterable between the secured state and an unsecured state; b) the anti-theft system receiving, from a consumer's portable electronic device, consumer data relating to the consumer; c) analyzing the consumer data received by the anti-theft system to determine the consumer's risk level; and d) directing the anti-theft system to transition from the secured state to the unsecured state upon the consumer's risk level being approved.

19 Claims, 17 Drawing Sheets

SYSTEM AND METHOD FOR PROVIDING CONSUMERS WITH ACCESS TO AN ARTICLE WHILE PREVENTING THEFT THEREOF

CROSS-REFERENCE TO RELATED APPLICATIONS

The present application claims the benefit of U.S. Provisional Patent Application Ser. No. 61/667,684, filed on Jul. 3, 2012, the entirety of which is incorporated herein by reference.

FIELD OF THE INVENTION

The present invention relates generally to systems and methods for preventing theft of an article such as merchandise in a retail store environment while providing consumers with increased access to the merchandise.

BACKGROUND OF THE INVENTION

Generating sales in a brick-and-mortar retail environment can be challenging, especially with increased competition from Internet-based retailers. Many online retailers lack the overhead costs associated with a physical store presence, such as the cost of rent, salespeople, theft, shrink, and security personnel, among others. Thus, online retailers generally are able to sell products at prices cheaper than those at brick-and-mortar locations. Online retailers are also able to conveniently deliver the shopping experience directly to the consumer, regardless of where the consumer is located. Additionally, the digital showroom provided by an online retailer enables consumers to more quickly and conveniently compare products, access and read product reviews, and discuss a potential product purchase with friends and family located elsewhere, often through the use of instant messaging, short message service ("SMS"), and other communication platforms such as social media networks.

As a result of the competition from online retailers, many brick-and-mortar retail establishments must compete by showcasing their products, providing an environment in which consumers can view, sample, touch and experience a product. For example, brick-and-mortar electronics retailers often provide consumers with live demonstrations, such as playing movies on television sets or providing kiosks that enable consumers to listen to music before making a purchase. Many of these retailers also provide consumers with the opportunity to test certain products, such as cameras, computers, and video games, prior to making a purchase. Similarly, clothing, sporting good, and big box retailers, among others, often allow consumers to try on items of interest in a changing room to see how the product looks and feels. Regardless of the exact method, it has become increasingly important for traditional brick-and-mortar retailers to enable and encourage consumers to interact with and test products in a fun, entertaining, interactive and exciting environment in order to complete a sale. The ability of brick-and-mortar retailers to provide consumers with an opportunity to interact with a product has become a critical competitive advantage, if executed properly.

Nevertheless, many brick-and-mortar retailers struggle to balance the need to promote products through samples and live demonstrations while also protecting their inventory and products from damage and theft. Many different types of security apparatuses currently exist to secure consumer goods to or within retail establishments, which are otherwise accessible for consumers to access, touch, explore, investigate, experience and sample. For example, consumer electronic products are often physically secured to a display area by cables. Clothing, in turn, is often secured with the use of a radio-frequency identification (RFID) tag, which sounds an alarm or triggers an ink-based explosion when the consumer who is accessing the product removes it from a designated area within the retail establishment. Additionally, many items, ranging from firearms to even teeth whitening packets in a pharmacy, are secured by RFID tags and even further by devices such as a locked glass encasement.

These security apparatuses, however, have many disadvantages. First, they often restrict and limit consumers' ability to access, touch, explore, investigate, experience and sample the products in a manner that provides an opportunity to truly test many of the product's features. For example, a digital camera that is secured to a display shelf by a metal cable prohibits the consumer from testing and experiencing the full functionality of the product. The consumer is confined to the limited surrounding that is within the reach of the security cable, which may not be an ideal testing ground for the product. Second, access is often further restricted and limited by insufficient (and costly) manpower. In particular, salespeople are often unable to service the volume of consumers who wish to test or sample a product that must be unlocked or removed from a security apparatus. For example, a consumer wishing to try on a leather jacket secured to a hanger or display shelf at a department store must find a salesperson to remove the cable and disable the alarm. The salesperson must then wait while the consumer tries on the jacket and contemplates whether to purchase the item. With more expensive luxury goods, this process may take a substantial amount of time—time during which the salesperson is unable to service other consumers. When this happens, unattended consumers often get tired of waiting and, feeling neglected and frustrated by the lack of service, take their business elsewhere. This can leave a lasting negative impression on those consumers that is extremely costly and difficult to change. Third, security guards and surveillance equipment, which are expensive and can be intrusive to the consumer, often have the effect of intimidating consumers and creating a hostile and anxiogenic shopping environment. Fourth, loud and frightening alarms that sound when a consumer, intentionally or unintentionally, removes a secured product from a designated area similarly create a tense and hostile shopping environment. Lastly, some existing security devices intentionally trigger an ink-based explosion in order to destroy the merchandise when it is removed from a designated secure area. These devices do not prevent the theft, but merely ensure the destruction or damage of the product in an attempt to discourage theft of the product.

Additionally, the theft prevention techniques mentioned above do not enable the brick-and-mortar retailer to capitalize on the relationship that is created with the consumer during the consumer's in-store interaction with and testing of the product after the consumer has left the retail establishment. For example, the failure of a consumer to purchase a product that was sampled while visiting a brick-and-mortar store does not mean that the consumer does not want to purchase the product. Rather, the consumer may wish to gather additional information, add it to a "wish list" for others to buy on his or her behalf, or merely give further thought to the purchase. In these circumstances, it's important for a brick-and-mortar business to be able to maintain the relationship with the consumer outside of the store, whether in the consumer's home or anywhere else where the consumer may decide to make the purchase.

Thus, a new system and method is needed to give consumers access to a product with fewer restrictions and intrusive security measures while maintaining sufficient anti-theft technologies to identify, deter, and stop theft. Also, a system and method is needed that can integrate the interactive showcasing and sampling opportunities found in traditional brick-and-mortar retailers with the convenient, pressure-free, and web-based social characteristics found through online shopping. Furthermore, a system and method is needed that enables a consumer to seamlessly and wirelessly store and access information concerning a product of interest, or a product that the consumer sampled or tested at a brick-and-mortar store. Furthermore, a system and method is needed that enables a consumer to purchase the products that the consumer was able to test and sample while at the brick-and-mortar retailer at any time after such sampling, regardless of where the consumer is located. A system and method of this type will enable a brick-and-mortar retailer to transfer the benefits of its personalized consumer service opportunities to the convenient web-based purchase methods more commonly provided by online retailers.

SUMMARY OF THE INVENTION

These and other needs are satisfied by the present invention, which in one aspect is directed to systems and methods for preventing theft of articles such as merchandise at a retail store while providing consumers with increased access to the merchandise. In one aspect, the invention can be a method for providing consumers with access to an article, the method comprising: a) securing the article in a secured state using an anti-theft system, the anti-theft system alterable between the secured state and an unsecured state; b) the anti-theft system receiving, from a consumer's portable electronic device, consumer data relating to the consumer; c) analyzing the consumer data received by the anti-theft system to determine the consumer's risk level; and d) directing the anti-theft system to transition from the secured state to the unsecured state upon the consumer's risk level being approved.

In another aspect, the invention can be a non-transitory computer-readable storage medium encoded with instructions which, when executed on a processor, performs a method for providing consumers with access to an article, the method comprising: a) securing the article in a secured state with a security apparatus, the security apparatus alterable between the secured state and an unsecured state; b) receiving consumer data related to a consumer from a portable electronic device carried by the consumer; c) analyzing the consumer data to determine the consumer's risk level; and d) directing the security apparatus to transition from the secured state to the unsecured state upon the consumer's risk level being approved.

In yet another aspect, the invention can be a system for providing consumers with access to an article comprising: an anti-theft system comprising a security apparatus and a server having a processor, the security apparatus securing the article in a secured state and being alterable between the secured state and an unsecured state; a portable electronic device carried by a consumer; and wherein the processor is configured to: a) receive consumer data relating to the consumer from the portable electronic device carried by the consumer, the consumer data stored in a database on the server; b) analyze the consumer data to determine a risk level of the consumer; and c) direct the security apparatus to transition from the secured state to the unsecured state upon the consumer's risk level being approved.

In a further aspect, the invention can be a method for providing consumers with access to an article, the method comprising: a) securing, the article in a secured state using an anti-theft system, the anti-theft system alterable between the secured state and an unsecured state; b) the anti-theft system receiving, from a consumer's portable electronic device, consumer data relating to the consumer; c) directing the anti-theft system to transition from the secured state to the unsecured state; and wherein step c) is completed without the consumer purchasing the article.

In still another aspect, the invention can be a method of purchasing articles, the method comprising: a) receiving and storing, on a portable electronic device of a consumer, first product data in response to the portable electronic device being brought into near field communication with a first product located at a first retail store, the first product data being retrieved from a first retailer system; b) receiving and storing, on the portable electronic device, second product data on the portable electronic device in response to the portable electronic device being brought into near field communication with a second product located at a second retail store, the second product data being retrieved from a second retailer system; c) generating a list of products based on at least the first and second product data stored on the portable electronic device; d) displaying the list of products on the portable electronic device that includes the first and second products; e) transmitting, to the first retailer system, a purchase request that includes purchase data for the first product upon selection of the first product from the list of products; and f) transmitting, to the second retailer system, a purchase request that includes purchase data for the second product upon selection of the second product from the list of products.

In a still further aspect, the invention can be a method of providing product information to a consumer, the method comprising: a) detecting when a portable electronic device of the consumer is brought into near field communication with a product; b) generating tailored product data based on consumer data relating to the consumer and product data relating to the product; c) transmitting the tailored product data to the portable electronic device; and c) displaying the tailored product data on the portable electronic device.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
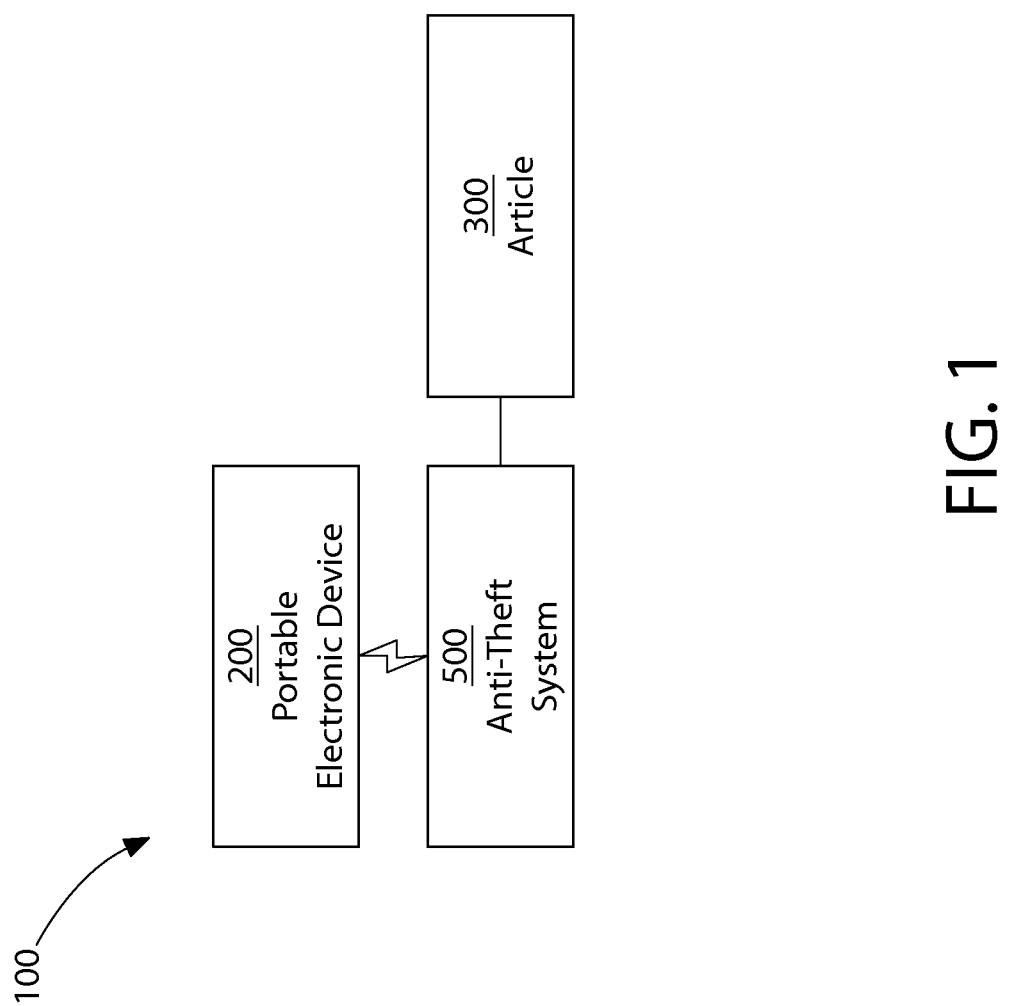
FIG. 1 is a schematic diagram of a system for providing consumers with access to an article while preventing theft thereof including, in operable communication, a portable electronic device, an anti-theft system and an article in accordance with an embodiment of the present invention.

The description of illustrative embodiments according to principles of the present invention is intended to be read in connection with the accompanying drawings, which are to be considered part of the entire written description, in the description of embodiments of the invention disclosed herein, any reference to direction or orientation is merely intended for convenience of description and is not intended in any way to limit the scope of the present invention. Relative terms such as "lower," "upper," "horizontal," "vertical" "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device of circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Exemplary embodiments of the present invention are disclosed herein. Generally, these embodiments provide consumers with unrestricted access to products for sampling purposes in and around a retail store without diminishing a retail store's ability to protect itself against theft or the loss of a sale. It should be appreciated that there are many more embodiments with respect to the current invention and that, even with respect to the embodiments included, certain steps may not always be necessary or even performed in the same precise order. Furthermore, a person skilled in the art would understand that while certain devices of the invention are described herein as containing specific components, those devices may include only some of the components described, all of the components described, or all of the components described and additional components as would be readily appreciated by a person of ordinary skill in the art.

Referring first to FIG. 1, a system and method for providing consumers with access to an article, such as a product or merchandise that is sold in a retail store, will be described. FIG. 1 illustrates a system 100 including a portable electronic device 200, an anti-theft system 500 and an article 300 that is operably coupled to, and in some instances secured by, the anti-theft system 500 or a component of the anti-theft system 500. As used herein, the article 300 may be any product or merchandise available for sale from a retail establishment to a consumer. Non-limiting examples of articles 300 include mobile phones, digital cameras, personal computers, laptop computers, televisions, autoportable electronics, other electronic devices, clothing, accessories, home goods, personal care items, furniture, office supplies, jewelry and countless other consumer products. It should be noted that the invention is not limited to those consumer products explicitly denoted herein, but may include any consumer product as understood in the art. Thus, any product that can be purchased by a consumer at a retail store can be used as the article 300.

As will be discussed in greater detail below with reference to FIG. 3, the anti-theft system 500 may include, among other components, a security apparatus 501 (see FIG. 3) that restricts or limits a consumer's ability to, or the manner and degree to which the consumer may access, touch, explore, investigate, experience or sample a particular consumer product, such as the article 300. The anti-theft system 500, and more particularly in certain embodiments the security apparatus 501 of the anti-theft system 500, is a device that has a secured state and an unsecured state, and that when in the secured state secures a consumer product such as the article 300 by either preventing physical access to the article 300 by a consumer, or by prohibiting certain actions with respect to the article 300. In certain embodiments it may be considered that the anti-theft system 500 generally has the secured state for securing the article 300 and the unsecured state for releasing the article, and in other embodiments it is the security apparatus 501 of the anti-theft apparatus 500 that has the secured state for securing the article 300 and the unsecured state for releasing the article 300. As discussed in more detail below, the system 100 provides consumers access to a secured consumer product.

For example, the security apparatus 501 may be a physical device that restricts the movement of the article 300, such as, but not limited to a cable that secures a digital camera to a display shelf, a cable that secures an article of clothing to a rack, a glass or plastic enclosure having a releasable barrier or door, a glass or plastic enclosure having an infrared or other electromagnetic field capable of detecting when an object breaks the electromagnetic field, a releasable hook from which the article hangs 300 that in the secured state prevents removal of the article 300 from the hook and in the unsecured state enables removal of the article 300 from the hook, or the like. Further, the security apparatus 501 may also be software that restricts the full operation of the article 300, such as, but not limited to software residing on a personal computer that restricts certain functionality of the personal computer or software residing on any electronic device that prohibits the consumer from turning the product on or testing and experiencing the full functionality of the product. The security apparatus 501 may also be a fitting room door. Thus, the security apparatus 501 may be any physical device or properly programmed processor that restricts a consumer's full access to a consumer product such as the article 300 when the security apparatus 501 (or the anti-theft system 500) is in a secured state, and that releases the article 300 or otherwise enables a consumer to have full access to the article when the security apparatus 501 (or the anti-theft system 500) is in an unsecured state to enable the consumer to access, touch explore, investigate, experience and/or sample the article 300.

As illustrated in FIG. 1, the electronic portable device 200 is in operable communication with the anti-theft system 500. In the exemplified embodiment, the communication between the electronic portable device 200 and the anti-theft system 500 is wireless, although the invention is not to be so limited and a hardwire connection between the electronic portable device 200 and the anti-theft system 500 can be used in other embodiments. Thus, a user can use the portable electronic device 200 to provide information to the anti-theft system 500 so that the anti-theft system 500 can make a determination regarding whether to transition into an unsecured state to enable the consumer to have full access to the article 300. Furthermore, information can be transmitted from the anti-theft system 500 to the portable electronic device 200, such as information about the article 300 that is secured by the anti-theft system 500. Thus, the communication between the portable electronic device 200 and the anti-theft system 500 is two-way communication in certain embodiments, although the invention is not to be so limited in all embodiments and single-way communication is also contemplated.

In certain embodiments, communication between the portable electronic device 200 and the anti-theft system 500 is achieved via near field communication (NFC). Thus, the portable electronic device 200 can be equipped with NFC capabilities (i.e., an NFC enabled device) and the anti-theft system 500 can include an NFC tag, chip, sticker or the like. As a result, when the portable electronic device 200 gets to within a certain distance of the anti-theft system 500, the portable electronic device 200 can read or scan the NFC tag or chip and access data or information provided by the NFC tag or chip, and the NFC tag or chip can similarly access information from the portable electronic device 200. In certain embodiments, the distance between the portable electronic device 200 and the anti-theft system 500 that facilitates proper information transfer therebetween is between approximately 0-40 cm, or between approximately 15-30 cm, or approximately 20 cm. Of course, the communication between the devices is not limited to NFC, as will be discussed in more detail below with reference to FIG. 2.

Figure 2:
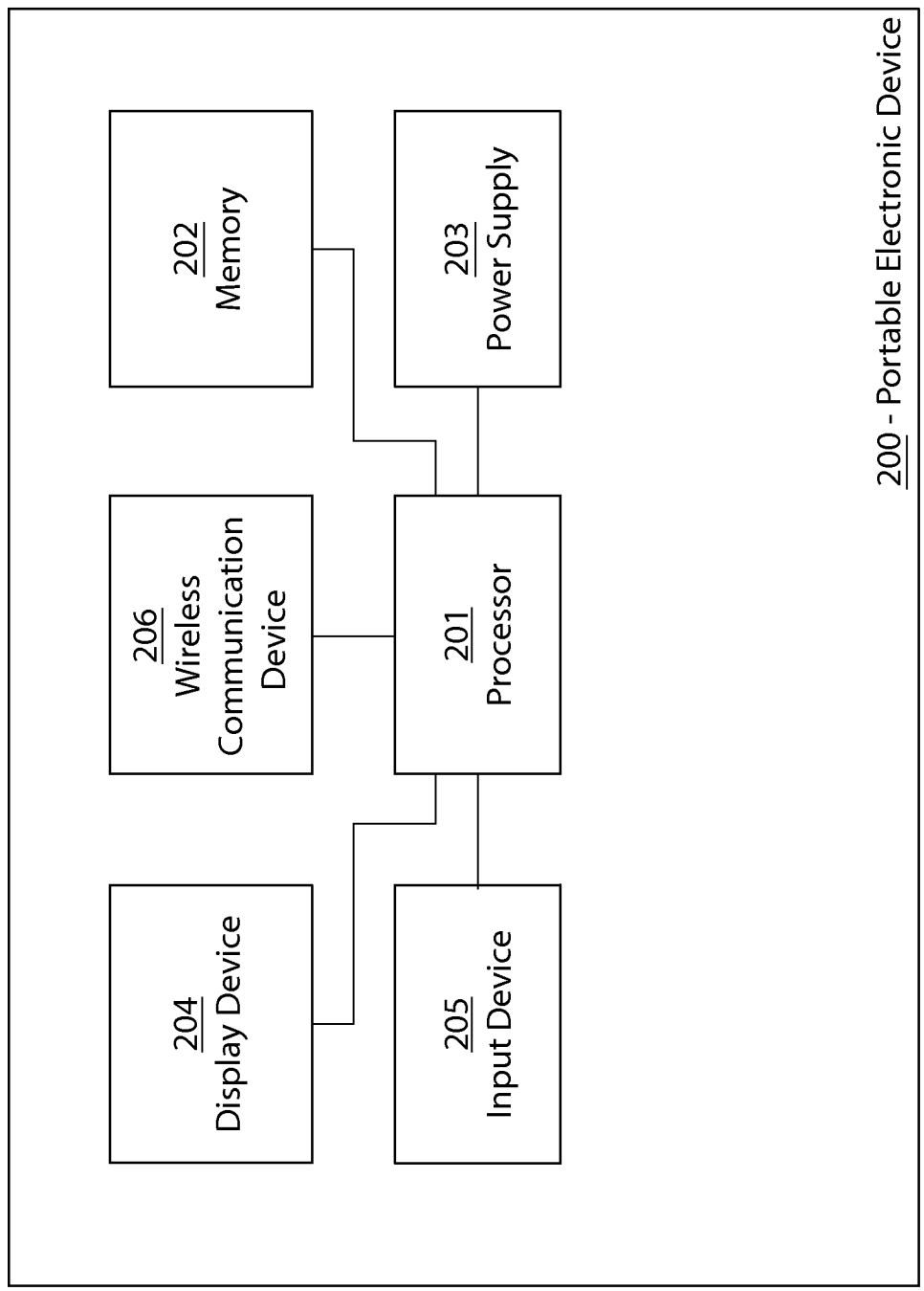
FIG. 2 is a schematic diagram of the portable electronic device of FIG. 1.

Referring to FIG. 2, one embodiment of the portable electronic device 200 is illustrated. The portable electronic device 200 can be any one of a number of devices, including without limitation, a smart phone, a cell phone, a tablet computer, a personal digital assistant ("PDA"), a laptop computer, a near field communication (NFC) enabled credit or debit card, a Fob (such as those used as car keys and work and apartment building access keys), or any other portable electronic computing device that comprises and/or is connected to a wireless communication device, such an RFID tag/reader or NFC chip/tag.

In accordance with the illustrated embodiment, the portable electronic device 200 comprises a processor 201, a memory 202, a power supply 203, a display device 204, an input device 205 and a wireless communication device 206, all of which are in operable communication such as by being, connected through the processor 201 as exemplified. As mentioned above, the invention is not limited to the portable electronic, device 200 having all of the components illustrated in FIG. 2, and the portable electronic device 200 may have more components than that illustrated or less than the entirety of the components illustrated.

In one embodiment, each portable electronic device 200 contains, or has access to, substantial amounts, and varying types, of personal and other identifying information of the consumer, such as the consumer's name, phone number, address, email address, contact list, application downloads, Internet searching history, recent product purchases, criminal background, SIM card serial numbers, payment and bank account information, portable electronic wallets, the VIN of a car owned by the consumer as well as its make, model, year, and price, hardware and network consumer registration profiles, social media accounts, pictures, place of employment, and more. This information/data may be stored on the memory 202 of the portable electronic device 200 or on an external memory unit from which the portable electronic device 200 can access and retrieve the information/data such as any of the various servers or networks of servers that are referred to as being in the cloud. In certain embodiments the invention utilizes an application that resides on the portable electronic device 200 and the application has access to all of the personal and identifying information of the consumer noted above, referred to herein collectively as consumer data, and more, such as by the consumer granting the application access to such information upon download.

Figure 3:
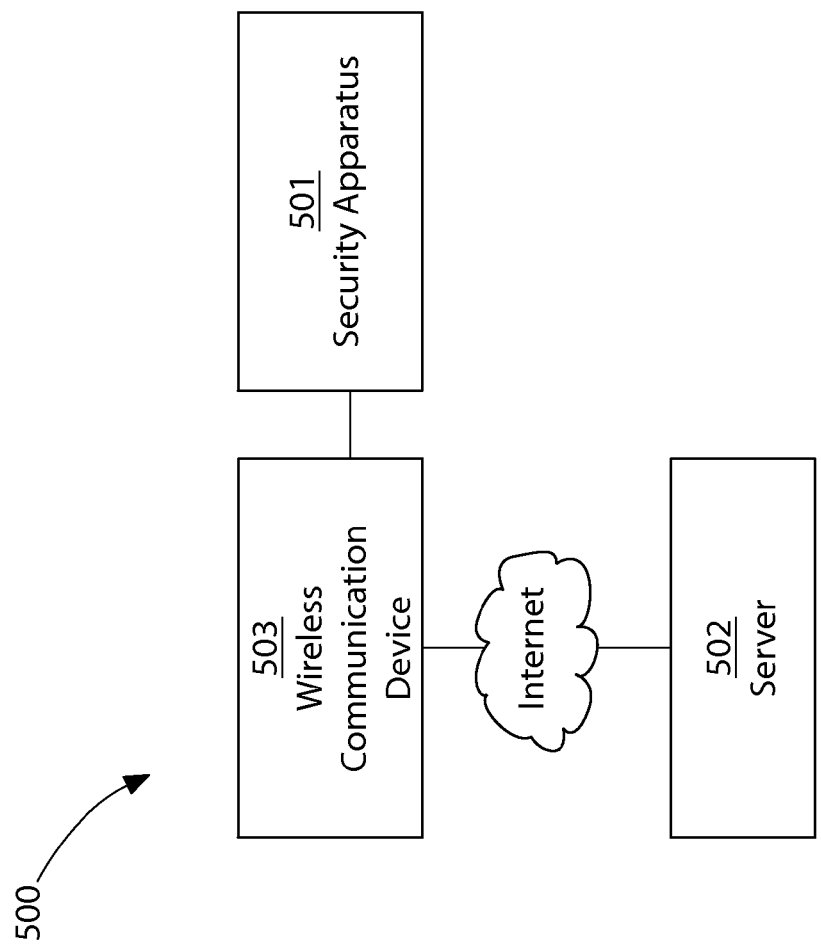
FIG. 3 is a schematic diagram of the anti-theft system of FIG. 1.

The wireless communication device 206 may be any device that facilitates communication between the portable electronic device 200 and the anti-theft system 500 (or a wireless communication device 503 of the anti-theft system 500, as illustrated in FIG. 3 and discussed in more detail below), such as NFC as discussed above. Of course, the wireless communication device 206 is not limited to being NFC enabled, and it may be, without limitation, an RFID tag/reader, NFC chip/tag, electromagnetic, Bluetooth, WIFI, cellular, I/O, DIDO, infrared, and sonar technologies. In some embodiments, the portable electronic device 200 has WIFI capabilities in addition to one or more of the other technologies noted above. The anti-theft system 500, or more specifically the wireless communication device 503 of the anti-theft system 500, is able to communicate with the portable electronic device 200 via RFID, NFC, RF, electromagnetic, Bluetooth, WIFI, cellular, wireless USB, I/O, DIDO, infrared, and sonar technologies, among others, depending on the wireless technology contained by those devices.

Referring to FIG. 3, one exemplary embodiment of the anti-theft system 500 is illustrated. In accordance with the illustrated embodiment, the anti-theft system 500 comprises a security apparatus 501 for securing the article 300, a wireless communication device 503, and a server 502. In the exemplified embodiment, the wireless communication device 503 communicates wirelessly with the server 502 through the Internet. However, the invention is not to be so limited and the wireless communication device 503 and the server 502 may communicate via a hardwire connection, or not at all in certain other embodiments. In certain embodiments, the server 502 may not form a part of the anti-theft system 500 and may instead be a separate remote server that is in communication with the wireless communication device 503. In still other embodiments, the wireless communication device 503 may not be in operable communication with the server 502 at all. In such embodiments, upon communication being established between the portable electronic device 200 and the wireless communication device 503, the portable electronic device 200 will communicate wirelessly with the server 502. These different methods of operation of the system will be discussed in more detail below.

Furthermore, in certain embodiments the wireless communication device 503 may be directly affixed to the security apparatus 501, directly affixed to the article 300, or it may be a separate device having its own housing that is operably connected, either wirelessly or via a hardwire connection, to one of the security apparatus 501 or the article 300 or both. The wireless communication device 503 can be, without limitation, an RFID tag/reader/sticker, NFC chip/tag/reader, electromagnetic, Bluetooth, WIFI, cellular, I/O, DIDO, infrared, and sonar technologies. Thus, the wireless communication device 503 of the anti-theft system 500 is able to wirelessly communicate with the wireless communication device 206 of the portable electronic, device 200. As a result of communication between the portable electronic device 200 and the anti-theft system 500, the anti-theft system 500 may transition from a secured state to an unsecured state, the portable electronic device 200 may transfer information and data (i.e., consumer data related to the consumer) to the anti-theft system 500 (i.e., to the server 502, or to a remote server), and the anti-theft system 500 may transfer information and data (i.e., product data related to the article 300, marketing materials, coupons and the like) to the portable electronic device 200. All of these transfers of data and information will be discussed in more detail below.

Figure 4:
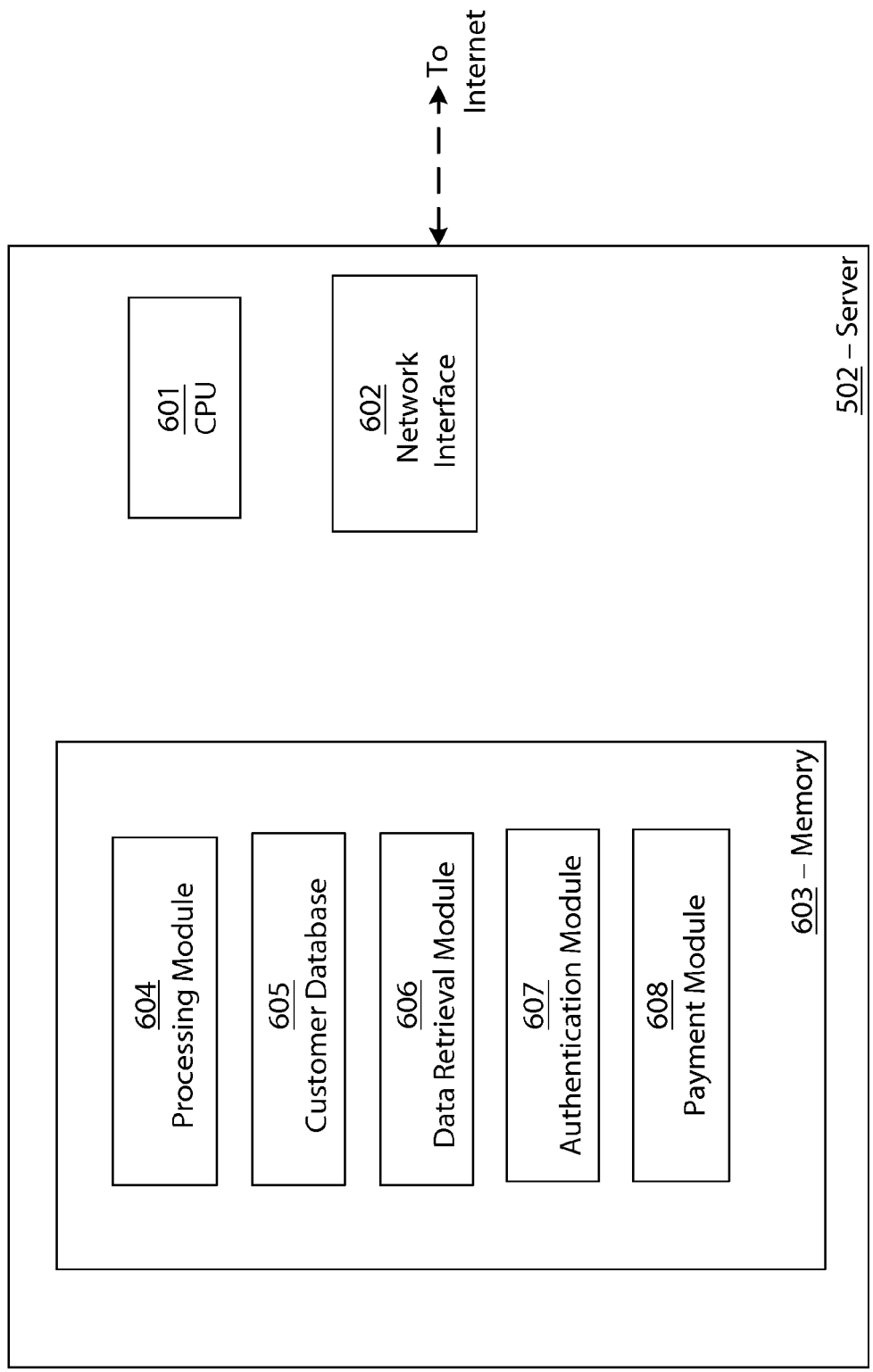
FIG. 4 is a schematic diagram of a server in accordance with an embodiment of the present invention.

Referring now to FIG. 4, one embodiment of a server 502 that can be used with the present invention will be described. In the exemplified embodiment, the server 502 comprises a properly programmed processor (CPU) 601, a network interface 602, and a memory unit 603. In the exemplified embodiment, the memory unit 603 comprises a processing module 604, a consumer database 605, a data retrieval module 606, an authentication module 607, and a payment module 608. Of course, more or less than all of the databases/modules can form a part of the server 502. In certain embodiments, the server 502 may not include any of the modules and databases, and they can instead be separate devices with which the server 502 is in operable communication.

The processing module 604 processes and organizes all of the information provided to the server 502. The consumer database 605 may be a consumer relationship management database, a loyalty rewards program database, a database containing consumer data or information about each of the consumer's that have shopped (and even possibly some that have not) in the particular retail store, or the like. The data retrieval module 606 retrieves data from the portable electronic device 200 or from databases with which the server 502 is in operable communication. The authentication module 607 approves or disapproves of a user's risk level to instruct the anti-theft system 500 to either remain in the secured state or to transition into the unsecured state. The payment module 608 retrieves payment information from the particular consumer (or the particular portable electronic device 200) with which the server 502 is in communication so that payment for the article 300 can be made if desired or if necessary in the event of a theft.

Although exemplified as a single memory unit, it should be noted that the invention is not so limited and in other embodiments the server 502 may comprise more than one memory unit 603. Further, although exemplified as a single server, it should be noted that in alternate embodiments the server 502 may take the form of any number of operably connected and properly programmed servers. As discussed in more detail below, the server 502 is configured to receive, store, and disseminate information relating to the consumer, the article 300, the portable electronic, device 200, and the anti-theft system 500. Further, although exemplified, as in electronic communication with the wireless communication device 503 via the internet in FIG. 3, it should be noted that the invention is not so limited and in alternate embodiments the server 502 may be operably connected to any of the other components of the system via other communication means, such as those described above. In certain embodiments, it should be understood that the server 502 is configured to perform the processes and functions described herein.

Figure 5:
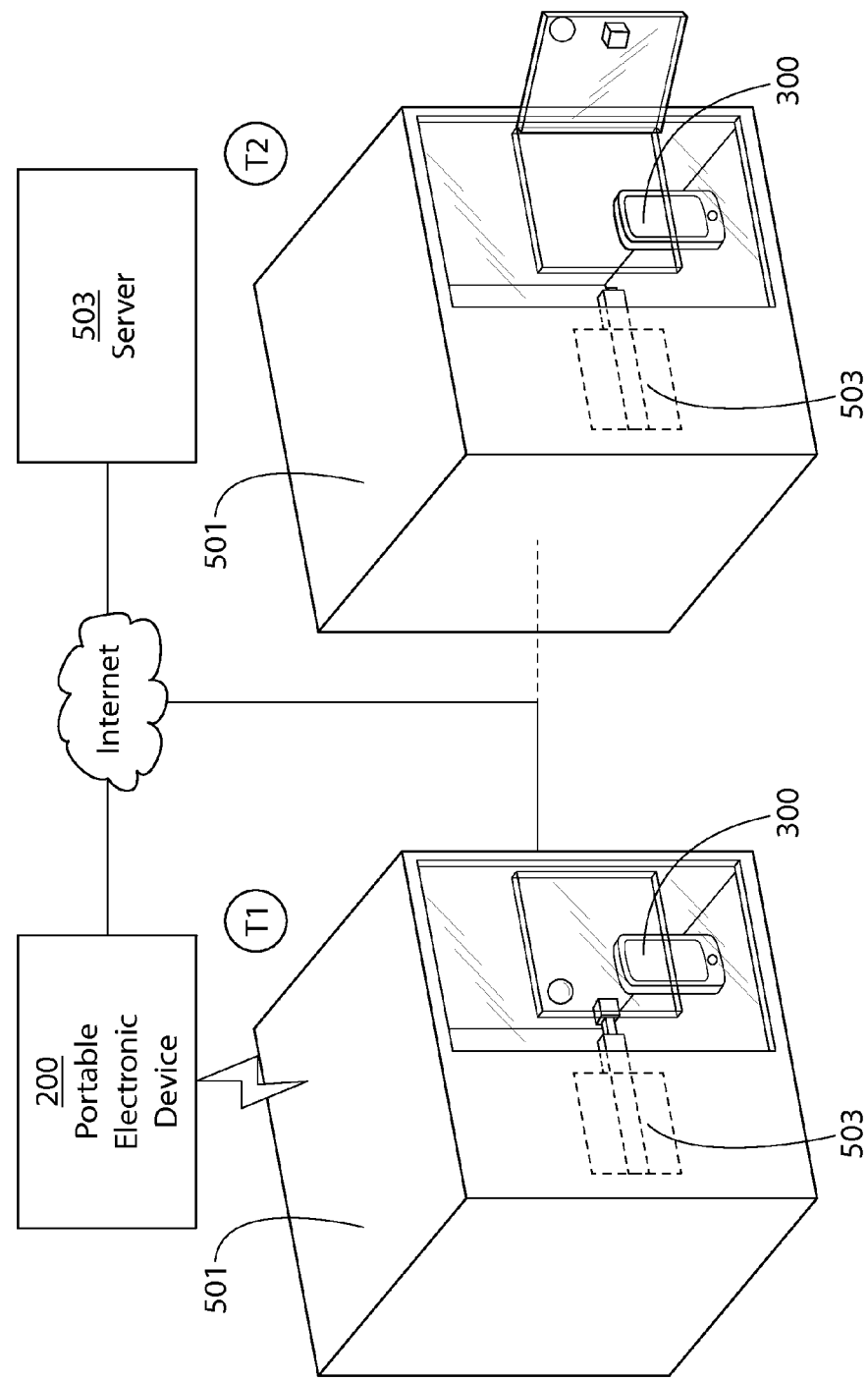
FIG. 5 is a schematic diagram of a system for permitting a consumer unrestricted access to an article in accordance with a first embodiment of the present invention.
Figure 6:
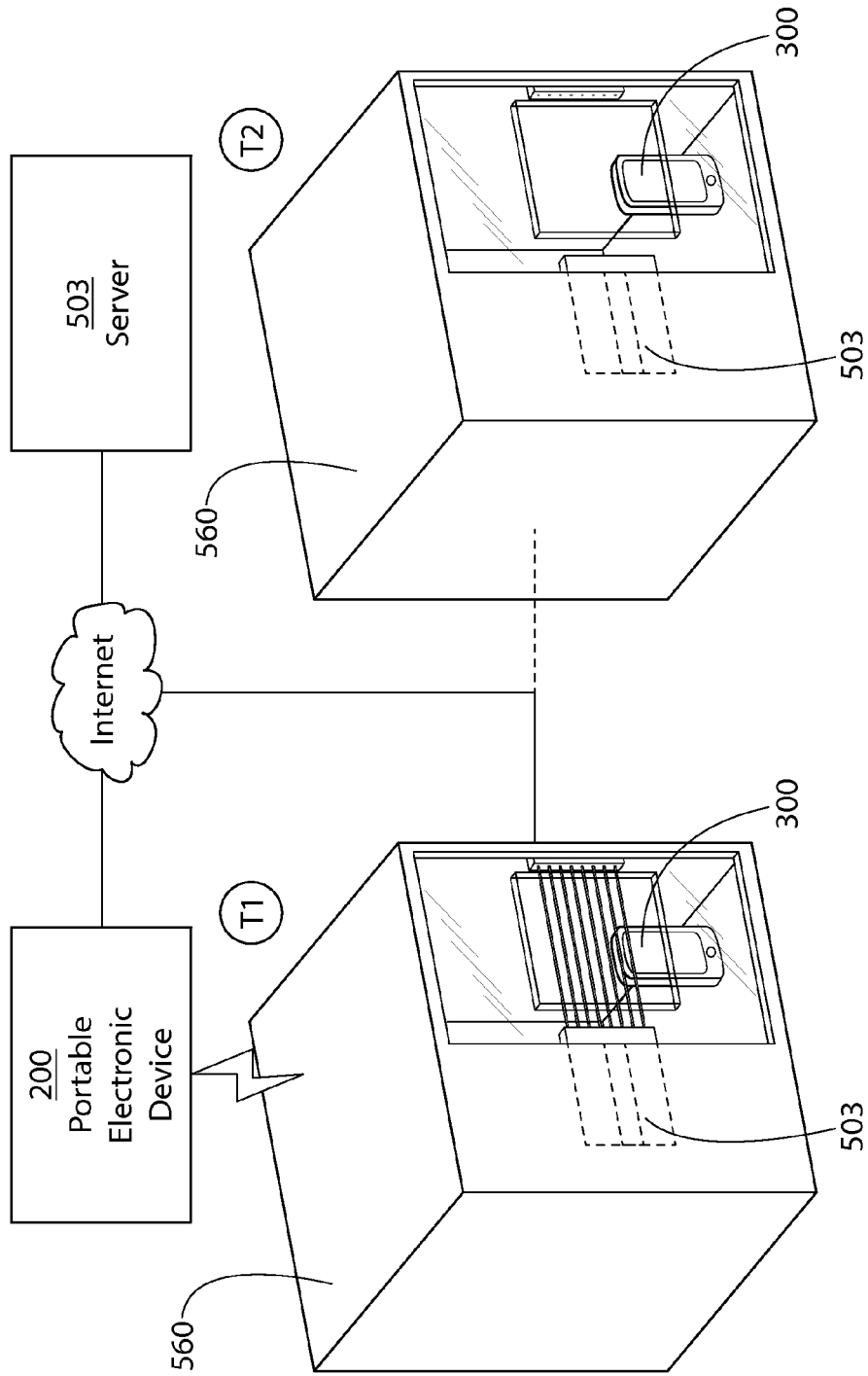
FIG. 6 is a schematic diagram of a system for permitting a consumer unrestricted access to an article in accordance with a second embodiment of the present invention.
Figure 7:
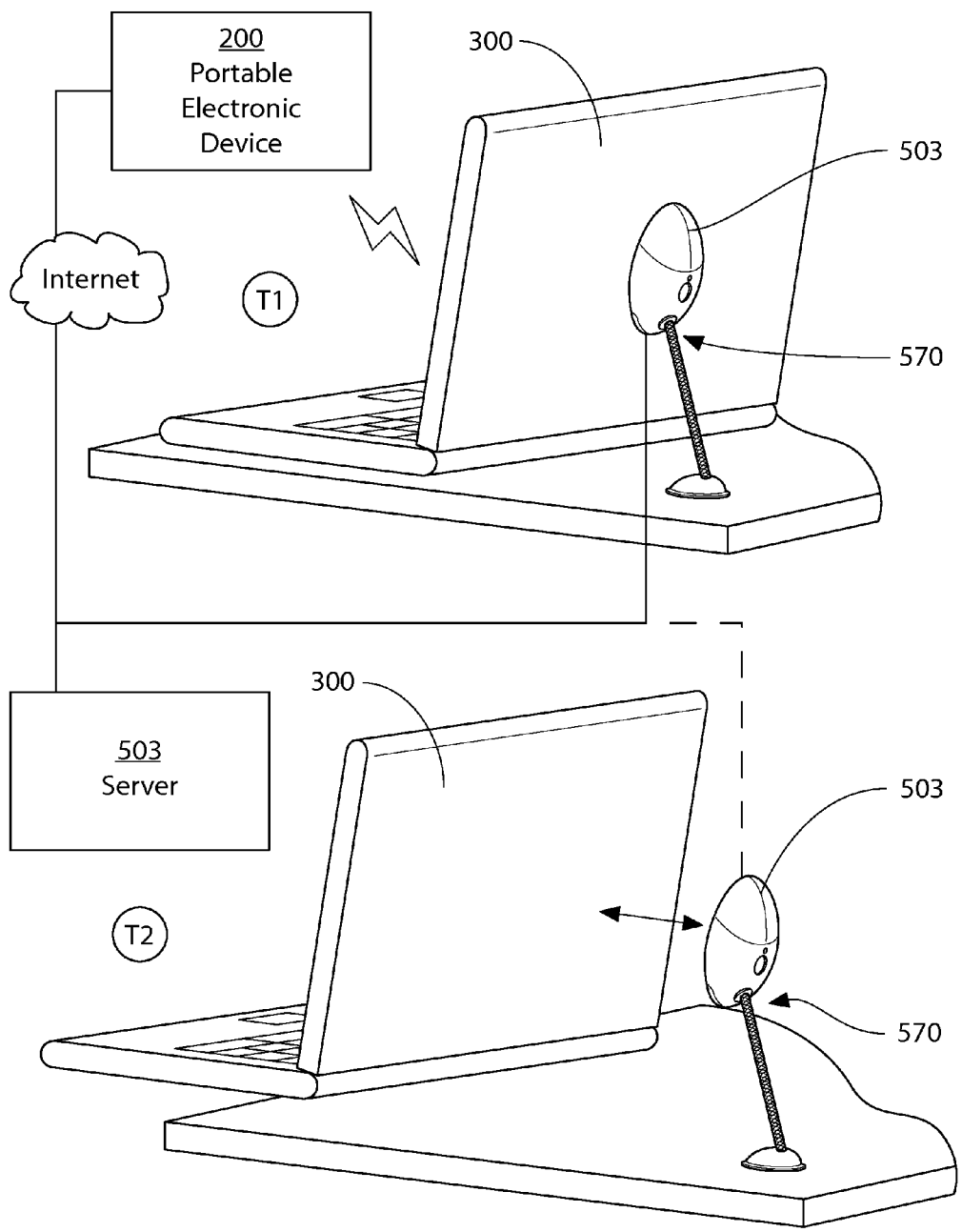
FIG. 7 is a schematic diagram of a system for permitting a consumer unrestricted access to an article in accordance with a third embodiment of the present invention.

Referring to FIGS. 5-7, exemplary embodiments of the present invention will be described. Referring first to FIG. 5, the invention will be described wherein the security apparatus 501 of the ant-theft system 500 is a plastic or glass enclosure having a locked door that prevents a consumer's access to an article 300, which in the exemplary embodiment is a mobile phone but can be any other consumer product such as those discussed above. At time T1, a consumer approaches the security apparatus 501 of the anti-theft system 500. The consumer is able to view the article 300 through the door of the security apparatus 501 because the door, and possibly other parts of the security apparatus 501, is transparent. If the consumer decides that he or she would like to have full access to the article 300 so that the consumer can test out the functionality of the article 300, the consumer will take out his or her portable electronic device 200, such as a mobile phone or the like, and will place the portable electronic device 200 into close proximity with the security apparatus 501 in order to facilitate wireless communication therebetween. Of course, in other embodiments a consumer may hardwire the portable electronic device 200 to the security device 501 or to the wireless communication device 503) to initiate communication therebetween.

In the embodiment illustrated in FIG. 5, the wireless communication device 502 is coupled directly to the security apparatus 501. Thus, upon placing the portable electronic device 200 into close proximity with the security apparatus 501 (or hardwired directly thereto), the portable electronic device 200 will also be in close proximity with the wireless communication device 502. When in close proximity, the wireless communication device 502 and the portable electronic device 200 will be in operable communication with one another, either via NFC, RFID, WiFi, or any of the other communication technologies discussed above. The wireless communication device 502 transmits a signal to the server 502 through the Internet or any other network (e.g., local area network, metropolitan, area network, wide area network) and transmits consumer data to the server 502, including, any identifying information about the consumer that the wireless communication device 503 can gather from the portable electronic device 200 (i.e., email address, name, address, phone number, social network accounts, payment accounts and the like as discussed above). In certain embodiments as discussed in more detail below, the server 502 may gather additional information about the consumer (i.e., consumer data) from remote databases. The server 502 processes this consumer data, computes a risk assessment using pre-programmed algorithms, and makes a determination regarding, whether the consumer's risk level should be approved. If the user's risk level is approved, at time T2 the security apparatus 501 is unlocked or transitioned into the unsecured state, the door is opened, and the user is able to access the article 300. If the user's risk level is not approved, the security apparatus 501 will remain locked in the secured state.

Although discussed above whereby consumer data is transmitted to the server 502 from the wireless communication device 503, the invention is not to be so limited in all embodiments. In certain embodiments, upon communication being established between the portable electronic device 200 and the wireless communication device 503, the portable electronic device 200 will communicate directly with the server 502 via the Internet or other network. During such communication, the server 502 will retrieve consumer data from the portable electronic device 200 (and from external databases as noted above) to enable the server 502 to make a proper approval or disapproval decision for unsecuring the security apparatus 501 based on the consumer's risk, level. In this embodiment, if the server 502 makes a determination that the consumer's risk level is approved, the server 502 will send an approval signal directly to the portable electronic device 200, and the portable electronic device 200 will transmit a signal to the wireless communication device 503 instructing the security apparatus 501 to unlock. Thus, the actual flow of the transmission of data and information between the portable electronic device 200 and the components of the anti-theft system 500 the security apparatus 501, the wireless communication device 503 and the server 502) is not to be limiting of the present invention and can be accomplished in a variety of ways. Specifically, all of the server 502, the portable electronic device 200 and the wireless communication device 503 may be in operable communication, or only some of those components may be in operable communication.

Referring now to FIG. 6, an alternative embodiment of a security apparatus 560 for use with the system is illustrated. The flow chart schematic of FIG. 6 is identical to the flow chart schematic of FIG. 5 with the exception that instead of the security apparatus 501 having a door that prevents access to the article 300, the security apparatus 560 generates an electromagnetic, field, such as an infrared electromagnetic field, that blocks the opening for providing access to the article 300. If a consumer attempts to access the article 300 while the security apparatus 560 is in the secured state, the security apparatus 560 will activate an alarm to inform store personnel that a consumer is attempting to access an article 300 without prior permission having been granted by the system. The communication between the various components in FIG. 6 is the same as with FIG. 5 and will not be described herein in detail.

FIG. 7 illustrates another embodiment of a security apparatus 570 that works with the system to prevent a consumer's access to an article 300 when the security apparatus 570 is in a secured state and permits a consumer to have access to the article 300 when the security apparatus 570 is in the unsecured state. Again, the communication between the various components in FIG. 7, such as the portable electronic device 200, the wireless communication device 503 and the server 502 is the same as that discussed above with regard to FIG. 5 and will not be repeated herein for brevity.

In the embodiment of FIG. 7, the security apparatus 570 is a tether device that does allow a consumer to touch, play with and move the article 300 even when the security apparatus 570 is in the secured state. Such tether devices are commonly used in stores that sell electronic equipment because they enable the consumer to utilize the functionality of the article 300 to some extent while preventing the consumer from fully accessing the article 300 so as to prevent theft thereof. However, a consumer may still desire additional, full access to the article before purchase in order to make a truly informed decision about the product, especially due to the fact that such electronic devices that can be previewed in this manner are expensive and the purchase thereof can be a fairly important decision for a consumer. In this embodiment, in its initial secured state at time T1, the tether is coupled to the article 300 and to a fixture of the retail store, such as a table, a wall or the like. However, upon the server 502 reviewing the consumer data and approving the consumer's risk level, the security apparatus 570 transitions into the unsecured state thereby enabling a consumer to have full access to the product, as illustrated at time T2.

Although the tether provides the consumer with some degree of access to the article 300 even when the tether is in the secured state, it does not provide the consumer with full access. By completely unlocking the tether upon approving the consumer's risk level, the consumer is then able to walk freely around the store, or even outside of the store in some embodiments, to play with the article 300 and practice its functionality. For example, if the article 300 is a digital camera, a user may not be able to fully practice its functionality when the camera is tethered to a table or wall. However, if the consumer is able to walk around the store or outside of the store with the camera while the store is still able to ensure the article 300 will not be stolen or that the store will be adequately compensated for such theft, the retail store can feel safe and protected and the consumer may be more likely to purchase the article 300.

Thus, three different types of security apparatuses 501, 560, 570 have been discussed above and illustrated in FIGS. 5-7. However, the invention is not to be limited by the three specific security apparatuses 501, 560, 570 illustrated. Rather, as noted above the security apparatus 501 may be any physical device or properly programmed processor that restricts a consumer's full access to a consumer product such as the article 300 when the security apparatus 501 is in a secured state, and that releases the article 300 or otherwise enables a consumer to have full access to the article 300 when the security apparatus 501 is in an unsecured state.

Figure 8A:
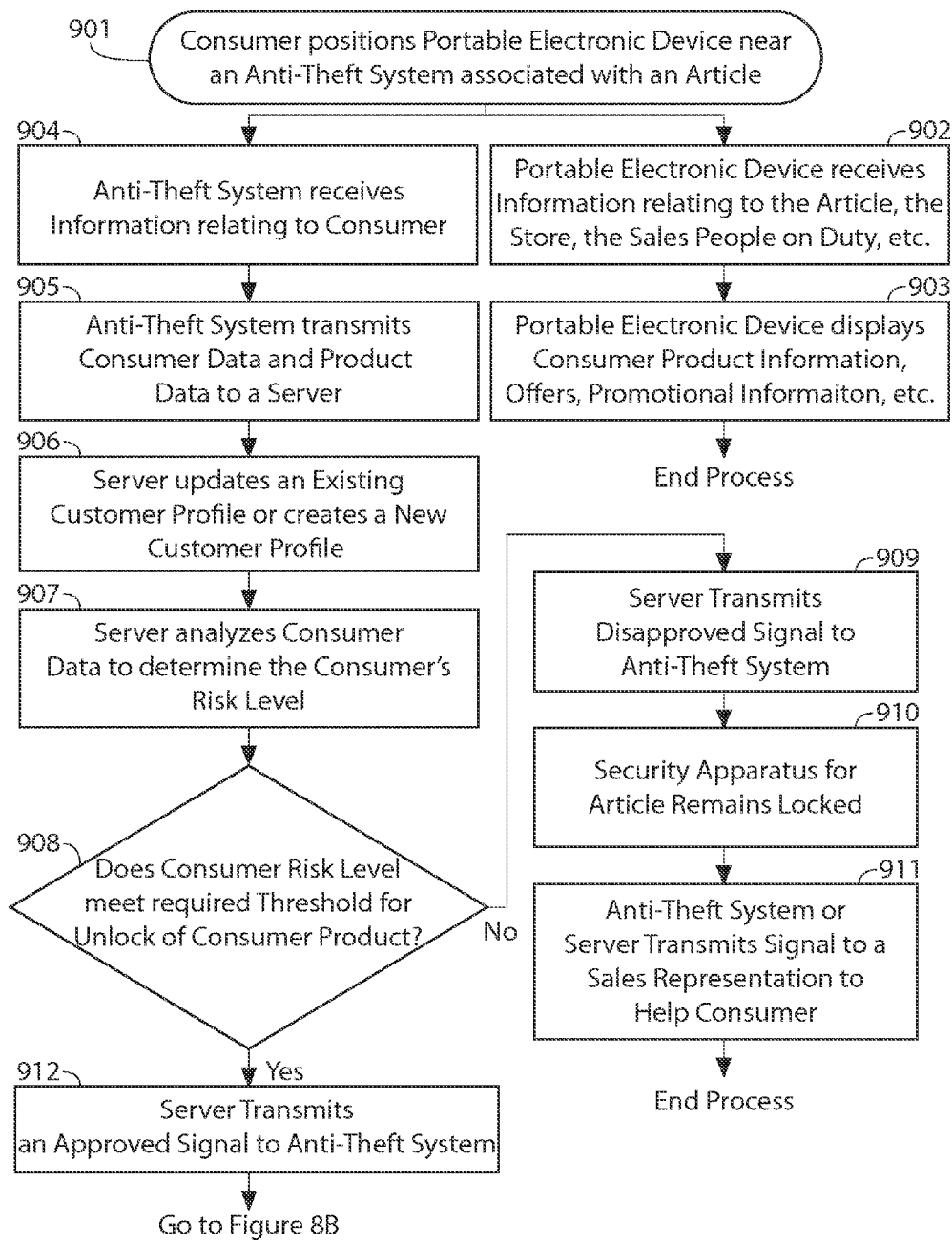
FIGS. 8A-C are a flow chart of a method for providing consumers with access to an article in accordance with an embodiment of the present invention.
Figure 8B:
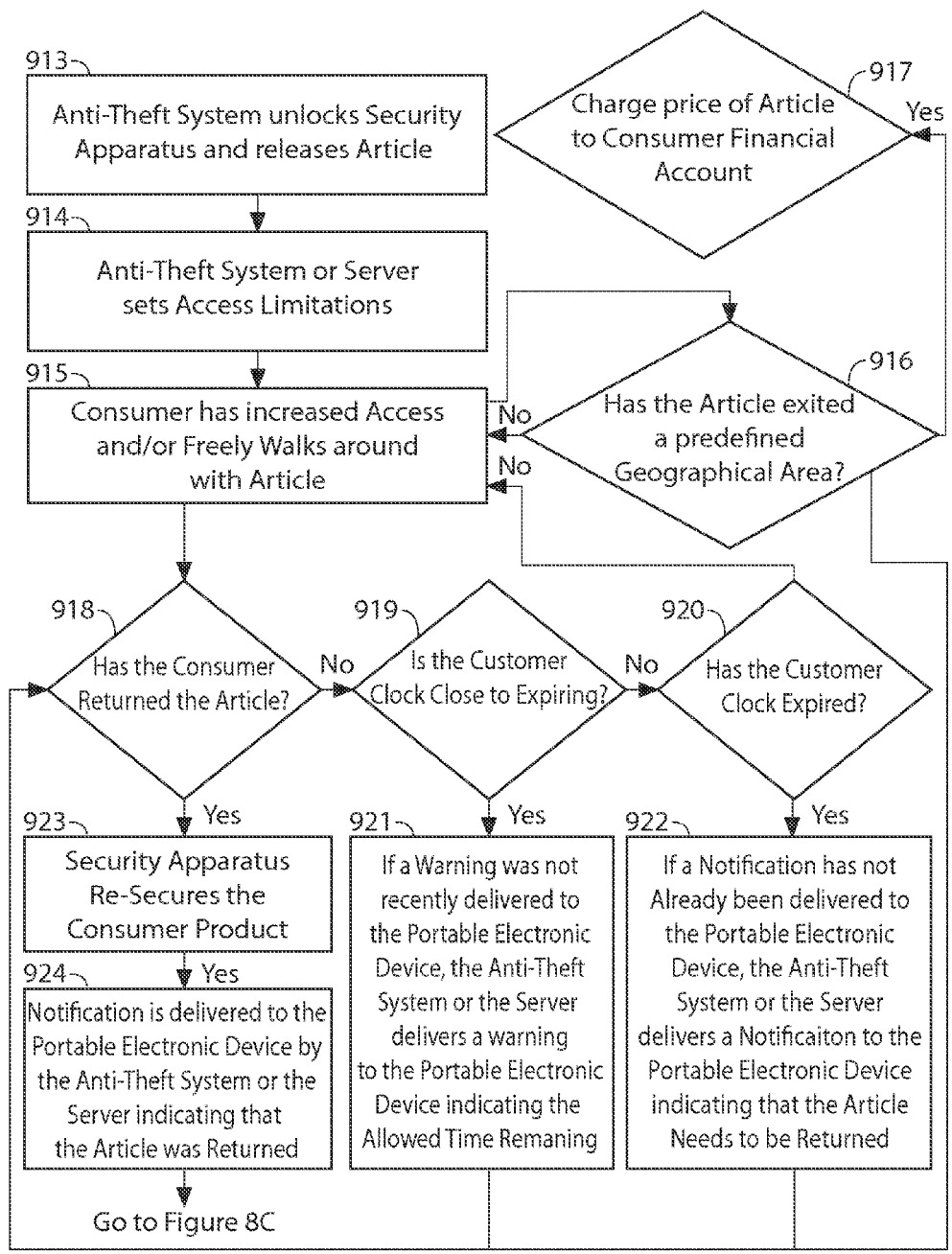
Figure 8C:
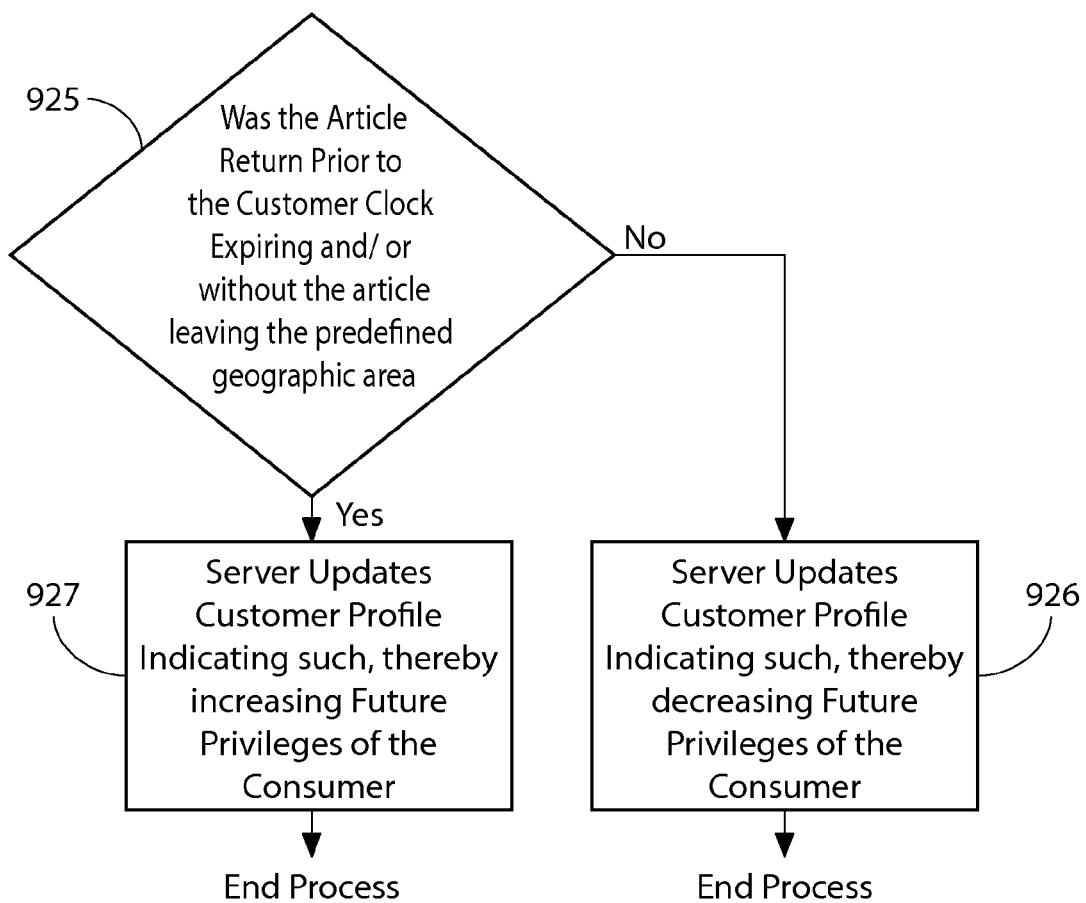

Referring now to FIGS. 8A-8C, a method of providing consumers with access to an article using the system features discussed above will be described in accordance with one embodiment of the present invention. The inventive method is described herein below with a series of steps identified as step 901 through step 927. However, it should be appreciated that additional steps may be included in the method, and in certain embodiments some of the steps may be excluded or omitted from the method. Furthermore, although the invention is described in terms of steps, in some embodiments certain different steps are performed simultaneously by the system although described herein as being different, steps. Furthermore, in some embodiments the steps may take place in a sequence different than that described herein below. Thus, various combinations of some or all of the steps identified below may be used in certain embodiments.

In the inventive method, a consumer is walking, around a brick-and-mortar retail store viewing the various products that the retail store has for sale. Some of the products may be freely accessible so that the user can fully access those products, such as the manner in which groceries and many other lower cost items are currently sold. However, others of the products may not be freely accessible such that they are either only viewable through a window or cabinet or case but unable to be felt, touched and played with, or such that they are capable of being touched and played with but are tethered to a structure so that they cannot be freely carried about the retail store. These items are typically higher priced items such as electronics, higher end clothing, jewelry and the like, or lower priced items that are easily and thus frequently stolen. Of course, in certain embodiments the inventive techniques and methods disclosed herein can be used for each and every product being sold in the store.

When the consumer comes upon an article 300 that is secured in a secured state using the anti-theft system 500, the consumer will view the article 300 and determine if he/she desires to have greater access to the article 300. As indicated at step 901, upon deciding that he or she would like to have greater access to the article 300, the consumer will position his or her portable electronic device 200 (i.e., mobile phone, tablet, key FOB or the like as described above) near the anti-theft system 500 associated with the article 300 that the consumer desires to have greater access to. In certain embodiments, the consumer will position his or her portable electronic device 200 near the wireless communication device 503 of the anti-theft system 500. Upon positioning the portable electronic device 200 near the anti-theft system 500 (or upon hardwiring the portable electronic device 200 to the anti-theft system 500), a communication link between the portable electronic device 200 and the anti-theft system 500 will be created. This communication link can be between the portable electronic device 200 and the wireless communication device 503, and then also between either: (1) the portable electronic device 200 and the server 502; (2) the wireless communication device 503 and the server 502; or (3) both. The manner in which data is transmitted to the server 502 is not as important as the mere fact that data should be transmitted to the server 502. Furthermore, as discussed above the server 502 can form a part of the anti-theft system 500 and can be a server that is owned and operated by the retail store, or the server 502 can be one or more servers that are external to the retail store and that are merely used to analyze the consumer data as discussed in more detail below.

In certain embodiments, at this stage (or a later stage in the process, the invention not being limited in that regard), it may be desirable to verify that the portable electronic device 200 being used to initiate communication has not been stolen and is in fact owned by the consumer who is carrying the portable electronic device 200. Thus, in certain embodiments at this stage the portable electronic device 200 or the anti-theft system 500 may prompt the consumer to enter in a previously stored passcode. In other embodiments the portable electronic device 200 or the anti-theft system 500 may ask the consumer to answer some personal questions about the consumer, such as date of birth, last four digits of social security number, mother's maiden name, or the like and the anti-theft system 500 would confirm that the consumer answers those questions correctly by comparing the answer with consumer data that the anti-theft system 500 has retrieved from the portable electronic device 200 or from external databases, as described in more detail below. In other embodiments, the portable electronic device 200 or the anti-theft system 500 may ask the consumer to answer a series of multiple choice questions, such as "which address is one that you have previously lived at" with a list of possible choices, or "which high school did you graduate from" with a list of possible choice. The anti-theft system 500 can again compare the answers provided with the actual answers based on consumer data that the anti-theft system 500 is able to access from the portable electronic device 200 directly and from external databases, as discussed in more detail herein. Any manner of verifying that the consumer holding the portable electronic device 200 is the actual owner of the portable electronic device 200 can be used, including those described above and others.

At step 902, upon communication being established between the portable electronic device 200 and the anti-theft system 500, in certain embodiments certain information about the article 300 that is secured by the anti-theft system 500, referred to herein as product data, can be transmitted to the portable electronic device 200 for the consumer's benefit. Specifically, the server 502, or the wireless communication device 503, may transmit product data including but not limited to price information, warranty details, instructions for use of the article, product dimensions, a description of product features, information comparing the product to other similar products, or the like. In addition, the product data may also include information about the retail store generally, information about the salespersons on duty, or any other type of information that may be useful for the consumer when making a purchasing decision for a particular article 300. The product data may be displayed directly on a display of the consumer's portable electronic device 200, or it may be displayed on a separate display positioned adjacent to the article 300 and anti-theft system 500, or it can be displayed directly on a component of the anti-theft system 500. Furthermore, at step 903 marketing information may be transmitted to and displayed on the portable electronic device 200, including without limitation consumer product information, offers, coupons, promotional information or the like.

In certain embodiments, the product data and the marketing information is displayed and stored locally on the consumer's portable electronic device 200 so that the consumer can refer back to the product data and to the marketing data at a later time. Thus, the consumer may decide not to purchase the article 300 at that particular time, but may decide hours, days, weeks or even months after leaving the store that he or she desires to purchase the article 300. In such embodiments, the consumer may be able to pull the product data back up on his or her portable electronic device 200 (either via an application or through direct storage thereon) and purchase the article 300 directly through the portable electronic device 200 without having to revisit the retail store, go to a website or enter in payment information.

The product data/information could be stored on an application or similar software that may enable the consumer to perform market research on the article 300, compare other products, and/or purchase the article from the store where the consumer interacted with the article. Further, in accordance with this embodiment, the application or similar software may also enable the consumer to manage his or her own personal wish list, track the various products that were tested in a convenient manner, initiate an instant messaging, Skype, VOIP, or other conversation with a store employee regarding any remaining questions, create an automatic "strike price" at which the software would automatically purchase the product on the consumer's behalf if the price reached a certain point, generate real-time product comparisons, or request coupons and other marketing materials from all or specific enumerated stores and/or locations. In another embodiment, the application or similar software may be used to solicit bids on behalf of the consumer in an attempt to see which store would offer the lowest bid. And, in yet another embodiment, the application or similar software could be used to access certain information located on similar software belonging to family and friends to see if anyone else has purchased the product (very helpful when searching for a Prom dress), or has any feelings regarding the product.

Furthermore, referring to step 904, upon communication between the portable electronic device 200 and the anti-theft system 500 being created, consumer data is transmitted to the anti-theft system 500 (i.e., to the server 502, or to a remote server that does not form a part of the anti-theft system 500 as discussed above). As discussed above, the consumer data includes, without limitation, the consumer's name, phone number, address, email address, contact list, application downloads, sports team affiliations, Internet searching history, recent product purchases, criminal background, SIM card serial numbers, payment and bank account information, portable electronic wallets, the VIN of a car as well as its make, model, year, and price, hardware and network consumer registration profiles, social media accounts, pictures, place of employment, and more. As noted in step 905, in certain embodiments where the server 502 does not form a part of the anti-theft system 500, the anti-theft system then transmits the consumer data (and possibly also the product data) to the server 502 or group of servers.

In step 906, the consumer data is transmitted to and stored in a consumer database. In certain embodiments, the server 502 may include a consumer database, or the server 502 may communicate with a separate consumer database that stores data related to consumers. The consumer database may include a storage bank of consumer data from all consumers who have previously accessed the anti-theft system 500, or from a grouping of potential consumers, or any other listing of people who have or may be interested in shopping at that particular retail store (or its associated stores). In certain embodiments, upon the consumer data being transmitted to the server 502 for to the anti-theft system 500), the server 502 will use the consumer data to locate an existing consumer profile, and then update the existing consumer profile if one exists. If the server 502 identifies the consumer's profile, it adds any supplemental information that is retrieved from the portable electronic device 300 that was previously unknown or that was previously ambiguous. This information would then be stored within the consumer database.

However, if the particular consumer is a new consumer that does not have an existing consumer profile, one will be created and saved in the memory of the server 502, of a separate remote server, or of the anti-theft system 500. Regardless of whether the server 502 locates an existing consumer profile or creates a new consumer profile, a web crawling and/or other data retrieval module may be used to further supplement the existing data to create a more accurate consumer profile. Thus, in certain embodiments the server 502 communicates with external databases or servers, such as social network servers, financial data servers, and any other type of server having information relevant to that consumer that can be found on the cloud. In certain embodiments, this information would be retrieved by the server 502, compiled into the particular consumer's profile, and then stored in the consumer profile in the server 502. It should be appreciated that in certain embodiments there is no consumer database and the consumer data is merely received by the anti-theft system 500 (which may include being received by the server 502) and from external databases, analyzed for risk as discussed below, and then discarded. However, saving a consumer profile on the server 502 can be advantageous to enable the retail store to maintain contact with the consumer, which may increase sales by enabling the retail store to establish a relationship with the consumer.

At step 907, the anti-theft system 500, which may include the server 502, has compiled all of the information about the consumer (i.e., all of the consumer data) that it has access to, including information obtained directly from the portable electronic device 200 and additional information that it was able to gather from external databases. At this step, the anti-theft system 500 (and/or server 502) processes the consumer data in order to make an informed decision regarding the amount of risk that the particular consumer will pose if that particular consumer is granted unrestricted access to the article 300. The determination of the amount of risk that a particular consumer will pose is an analysis, using various pre-programmed algorithms based on the consumer data that the anti-theft system 500 is able to compile, regarding the likelihood that the consumer will attempt to steal or damage the article 300. Thus, the anti-theft system 500 uses and analyzes the consumer data to determine the consumer's risk level.

In analyzing the consumer data to determine the consumer's risk level, the anti-theft system 500 uses a properly programmed algorithm that is either stored in the server 502 or elsewhere to analyze the consumer data and make a determination regarding whether the consumer's risk level is approved or disapproved. This may include coming up with a numerical number for the consumer's risk level and comparing it to a threshold level as indicated at step 908. However, the invention is not to be so limited and in certain embodiments the algorithm may be properly programmed to analyze the data and simply indicate an approval or disapproval of the consumer's risk level for access to the article 300 without computing a numerical value for the consumer's risk level.

For example, if a user has a previous arrest for theft and that information is retrieved by the anti-theft system 500, the algorithm will likely determine that the consumer's risk level is disapproved. However, it should be appreciated that a previous arrest for theft is not necessarily going to result in disapproval in all instances, as it is an analysis of the entirety of the consumer data that results in the final approval or disapproval decision.

Thus, upon conducting the analysis, the anti-theft system 500 makes a determination as to whether the consumer's risk level is approved, or disapproved. Referring to steps 909-911, the process that occurs upon a consumer's risk level being disapproved will be described. In step 909, the anti-theft system 500 has analyzed the consumer data and made a determination that the consumer's risk level is disapproved. This means that upon analyzing all of the data, the anti-theft system 500 has determined that the consumer is a potential theft risk or poses a risk of damaging the article 300, and that as a result unrestricted access to the article 300 should not be granted to that particular consumer. Upon the anti-theft system 500 disapproving the consumer's risk level, the anti-theft system 500, and more specifically the security apparatus 501 of the anti-theft system 500, will remain in the secured state, as shown at step 910. Upon such disapproval, in certain embodiments a disapproval signal may be sent to the consumer's portable electronic device 200 for display or displayed elsewhere in the consumer's line of vision, along with an explanation that the consumer's risk level has been disapproved and, in some embodiments, that a sales representative will be along to assist the consumer. It should be appreciated that when data or information is transmitted to the consumer's portable electronic device 200, such information may be provided via display on an application on the portable electronic device, via email, SMS, multimedia messaging service ("MMS"), voice message, instant message, or the like.

In certain embodiments as indicated at step 911, after the consumer's risk level is disapproved the anti-theft system 500 will transmit a signal to a sales representative indicating to the sales representative that a consumer attempted to gain access to the article 300, but was denied. The signal can be transmitted to a portable electronic device being carried by the sales representative or otherwise such as by being displayed on a display in the retail store, or by being transmitted through an audio system of the retail store, or by blinking a light or lights located at a particular location within the retail store. The notification to the sales representative of the disapproval should be somewhat discreet so as not to make the consumer feel uncomfortable because the retail store still desires to make a sale to the consumer despite the consumer not being approved for unrestricted access to the particular article.

Thus, in certain embodiments a sales representative can be informed that a consumer wants to view the article 300 but is not being granted access by the anti-theft system, and the sales representative can then approach the consumer and discuss the article 300 with the consumer, manually override the anti-theft system 500 to provide the consumer with access to the article 300 under supervision, or even manually override the anti-theft system 500 to provide the consumer with access to the article 300 without human supervision, but under the supervision of the anti-theft system 500, including geographical and temporal restraints as imposed by the anti-theft system 500 and discussed in more detail below.

Although it is noted above that the consumer may be informed of the disapproval, in certain other embodiments this may be undesirable because the retail store may not want the consumer to know that the anti-theft system 500 has perceived the consumer to be a theft threat because such knowledge by the consumer may make the consumer uncomfortable and much less likely to purchase merchandise at that particular retail store. Thus, in certain embodiments the anti-theft system 500 may remain in the secured state and may only transmit a signal to a sales representative so that the sales representative can assist the consumer without also informing the consumer of the disapproval. Furthermore, in certain other embodiments even if the consumer has been disapproved, the anti-theft system 500 may unsecure the product and give the consumer unrestricted access to the product, but a sales representative may also be notified so that the sales representative can monitor the consumer's use of and access to the article 300. In other embodiments, if the consumer is perceived to be a threat and is disapproved, the anti-theft system 500 may unsecure the product to give the consumer unrestricted access to the product, but the anti-theft system 500 may also direct a surveillance camera to monitor and/or record the consumer's movements around the store. Finally, in still other embodiments, there may not be an approval/disapproval process. Rather, in some embodiments the anti-theft system 500 may simply gather consumer data from the consumer as discussed above and then unsecure the article 300. In such embodiments, the anti-theft system 500 will be aware of who the consumer is and have identifying information about the consumer including his or her name, address, phone number, place of employment, and the like. Thus, in such an embodiment even if the consumer decides to steal or damage the article 300, the retail store would be able to telephone the police and direct them to the exact person who stole or damaged the article 300. Thus, in such an embodiment as long as enough consumer data is retrieved by the anti-theft system 500 in order to determine the identity of the consumer, the anti-theft system 500 will transition from the secured state to the unsecured state.

Referring now to step 912, if the anti-theft system 500, upon review of the consumer data, determines via the various algorithms as discussed above that the consumer's risk level should be approved, the anti-theft system 500, or the server 502, will transmit an approval signal directing the anti-theft system 500 to transition from the secured state to the unsecured state. As discussed above, there are many ways in which the anti-theft system 500 can determine that the consumer's risk level is approved. This can include using an algorithm to analyze all of the consumer's available data, such as prior arrest history, the arrest history of persons who are social network "friends" of the consumer or on the consumer's contact lists, educational background, occupational history, prior history of using the inventive system in that particular retail store or elsewhere (discussed in more detail below at steps 926 and 927), or the like to determine the likelihood that the consumer will attempt to steal or damage the article 300. The ways in which the anti-theft system 500 can determine that the consumer's risk level is approved also includes, in one embodiment, the mere ability of the anti-theft system 500 to determine the identity of the consumer as discussed above, or the mere ability of the consumer to purchase the article 300 (i.e., having sufficient hinds in a bank account).

In certain other embodiments, the consumer data includes financial account data. The consumer's financial account data can include information about the consumer's bank account(s), credit card(s), Paypal account(s), mobile wallet(s), digital wallet(s) and any other information related to financial accounts of the consumer that may be used to purchase the article 300 if so desired. This financial account data may be encrypted and stored on the anti-theft system 500 for future use, encrypted and stored on the anti-theft system 500 only until the consumer returns the article 300 to the anti-theft system 500, or in some embodiments it may remain unencrypted.

In certain embodiments, a review of the consumer's financial account data is all that is needed in order to approve of the consumer's risk level. Specifically, in one embodiment the analysis of the consumer data includes determining whether an account associated with the financial account data has available funds that are greater than or equal to a price of the article 300. If the anti-theft system 500 determines, through its analysis, that one or more of the consumer's accounts (either alone or taken in combination) has available funds that are greater than or equal to the price of the article 300, then the anti-theft system 500 (or server 502 or other remote servers) will automatically determine that the consumer's risk level is approved, and will direct the anti-theft system 500 to transition from the secured state to the unsecured state as discussed above. If the anti-theft system 500 determines, through its analysis, that none of the consumer's accounts has available hinds (either alone or taken in combination) that are greater than or equal to the price of the article 300, then the anti-theft system 500 will continue with the analysis to determine whether the consumer's risk level can still be approved based on other factors. Thus, although having sufficient funds to purchase the article 300 is one way for obtaining an automatic risk level approval in some embodiments, risk level approval can be achieved even without sufficient funds to purchase the article 300, and even if there is no financial account data available to the anti-theft system 500 for analysis.

As will be understood from the description below, this automatic approval is done because it will enable the retailer to charge the account of the consumer the price of the article 300 if the consumer does, in fact, attempt to steal the article 300 by leaving the store without paying for the article 300. However, the anti-theft system 500, due to its programming, understands that just because a consumer does not have sufficient funds to purchase the article 300 does not mean that the consumer will attempt to steal the article. Specifically, a consumer may desire to have full access to the article 300 to then decide whether to put the article 300 on a wish list, such as his or her Christmas or birthday list, which will be purchased by another person. As a result, the full analysis is completed in order for the anti-theft system 500 to make an informed and proper decision regarding the consumer's risk level. The anti-theft system 500 provides a proper balance of protecting the store against thievery while allowing consumers who qualify to have full and unrestricted (with some limitations, as discussed in more detail below) access to the article 300.

Furthermore, it should be appreciated that although the anti-theft system 500 attempts to compile and analyze financial account data of the consumer, the anti-theft system 500 does not charge the price of the article 300 to the accounts of the user at this stage in the process. Thus, the anti-theft system 500 provides a consumer with unrestricted access to the article 300 without charging the price of the article to the consumer's financial account(s). The review of the consumer's financial accounts is done for risk assessment purposes and enables the anti-theft system 500 to charge the consumer's account(s) in the event that the consumer does in fact attempt to or steal the article 300 or successfully steal the article 300.

Still referring to step 912, after the anti-theft system 500 determines that the consumer's risk level is approved, the anti-theft system 500 (or the server 502) will transmit an approval signal to the anti-theft system 500, and at step 913 the anti-theft system 500 will transition to the unsecured state, thereby unlocking and releasing the article 300 from the anti-theft system 500. In certain embodiments, after step 913 the consumer merely has unrestricted access to the article 300 and can freely walk around the store with the article 300, testing its functionalities, feeling its weight, and the like.

In other embodiments the method continues at step 914 whereby the anti-theft system 500 sets access limitations to the consumer's access to and/or use of the article 300. The access limitations may include, without limitation, geographical limitations, temporal limitations, partial access limitations (such as, for example without limitation, opening a case but still leaving the product tethered to a surface), or the like. In such an embodiment, at step 915, after the access limitations are set (described below in steps 916-922), the consumer has increased access to and/or freely walks around the retail store (or elsewhere) with the article 300. In certain embodiment, a retailer may provide certain consumers with more or less restrictive access limitations based on the perceived threat of the consumer as a thief. Additionally, in yet another embodiment a supervisor, salesperson, or other staff member may manually increase a consumer's access limitations based on observed reckless and disrespectful behavior that may damage the product.

As noted above, in certain embodiments the anti-theft system 500 may set geographical limitations on the consumer's access to the article 300. The geographical limitation is a predefined geographic area within which the consumer is required to remain while having free/unrestricted/partially restricted access to the article 300. Thus, the anti-theft system 500 will track the location of the article 300 (and/or of the portable electronic device 200 of the consumer) to ensure that the geographical limitations are being complied with. At step 916, the anti-theft system 500 analyzes whether the article 300 has exited a predefined geographic area. If the anti-theft system 500 determines that the article 300 has exited a predefined geographic area, in step 917 the anti-theft system 500 may (but does not necessarily, as discussed in more detail below) charge the price of the article 300 to a financial account of the consumer. If the anti-theft system 500 determines that the article 300 has not exited the predefined geographic area, the anti-theft system 500 goes to step 918 to determine whether the consumer has returned the article 300. The loop between steps 916, 937 and 918 continues until the consumer has returned the article, in which case the method continues onto step 923, discussed in more detail below.

Furthermore, the anti-theft system 500 also continually tracks whether the consumer has returned the article 300, as indicated at step 918. If the consumer has returned the article 300, the process continues to step 923. In certain embodiments, the process may simultaneously track temporal limitations (discussed below at steps 919-922) and geographic limitations set on the consumer's access to the product. Thus, the system will complete steps 919-922 at the same time as completing steps 916-917, and continuously until the article 300 is returned as indicated at step 918. Thus, as noted above, various modifications to the order of the steps indicated can be used in the method of the present invention.

Figure 9:
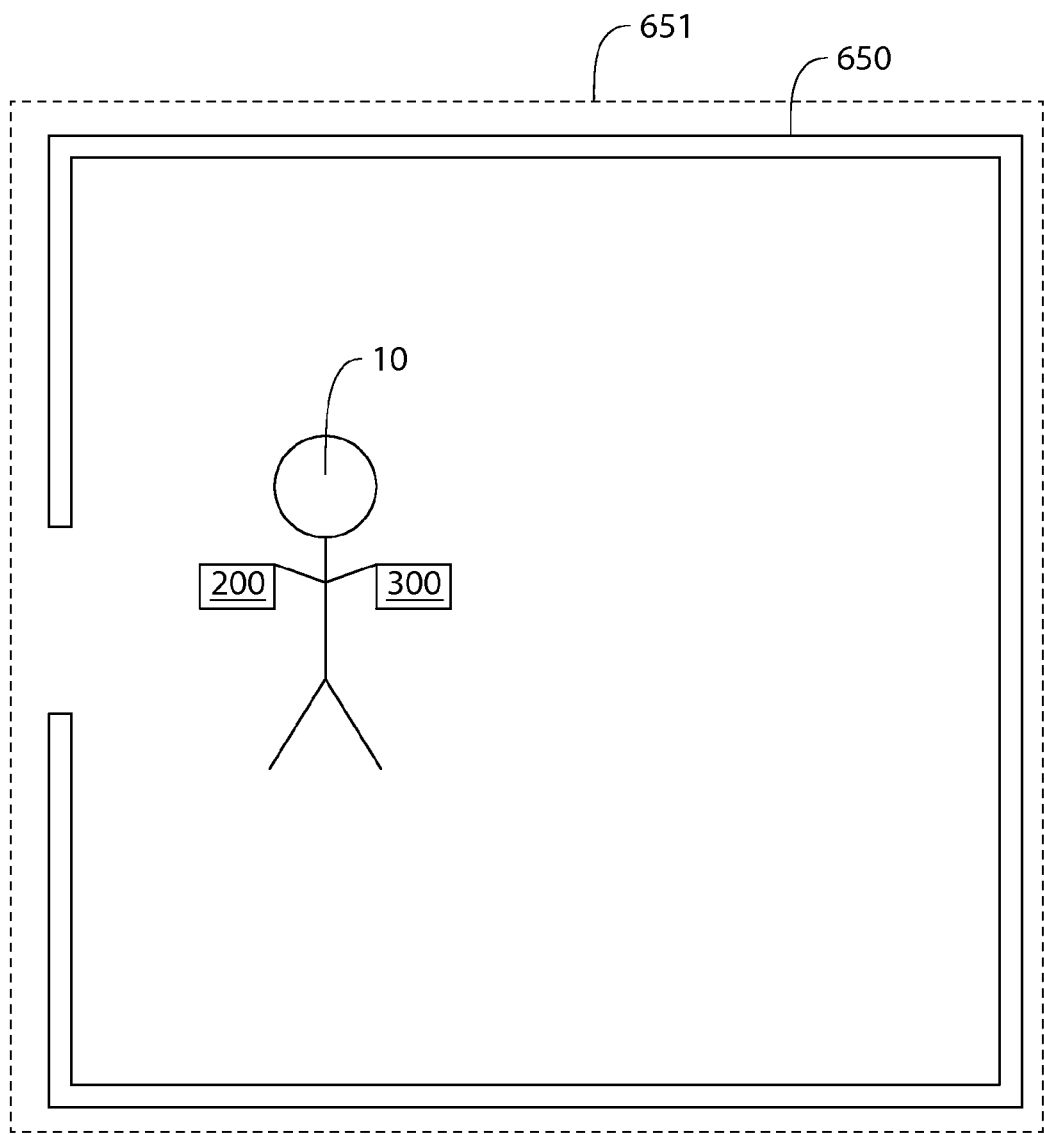
FIG. 9 is a schematic diagram illustrating a geographic limitation to a consumer's access to an article in accordance with one embodiment of the present invention.
Figure 10:
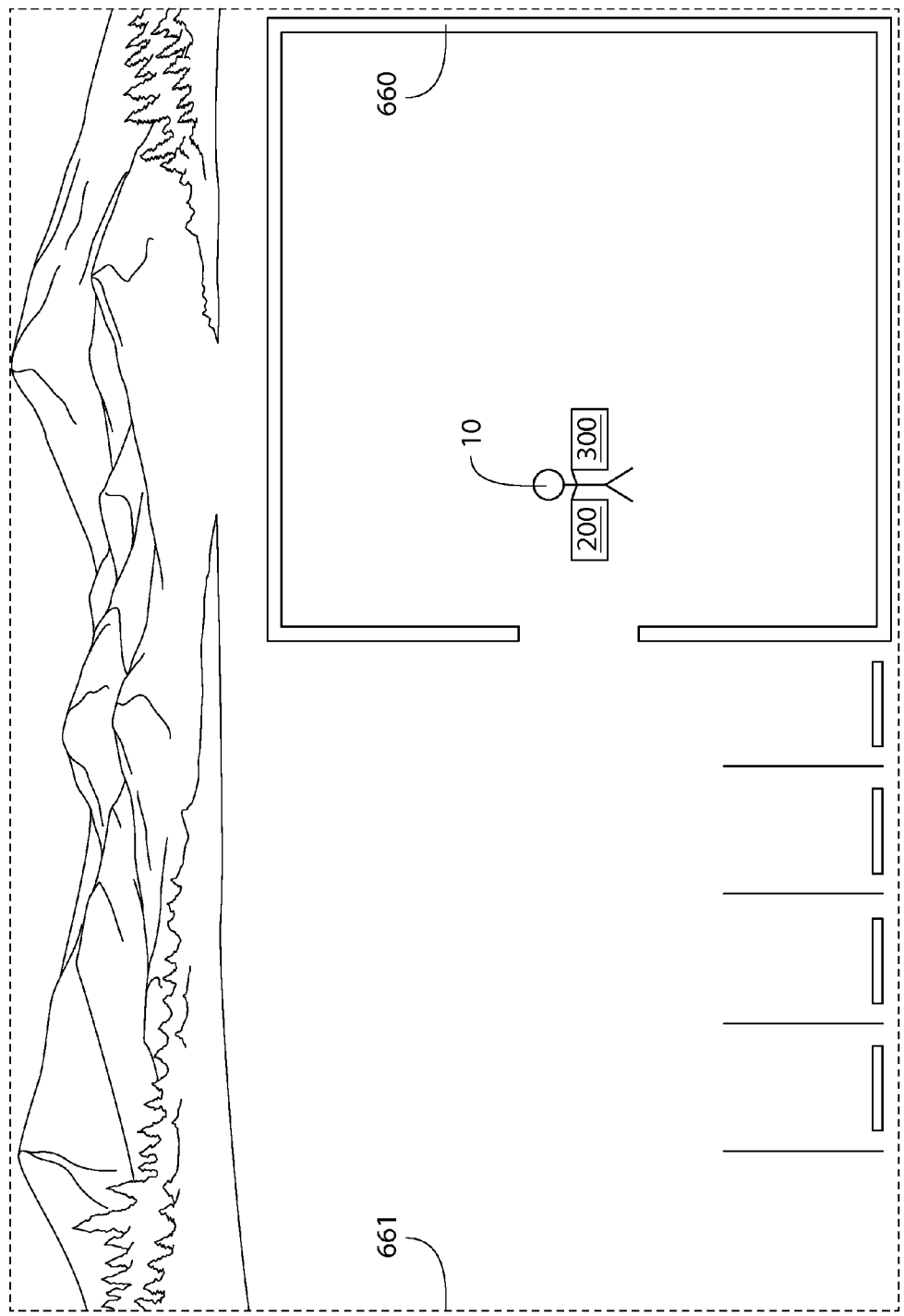
FIG. 10 is a schematic diagram illustrating a geographic limitation to a consumer's access to an article in accordance with another embodiment of the present invention.

Two examples of the geographical limitations that may be set are illustrated in FIGS. 9 and 10, respectively, it being understood that the invention is not to be particularly limited by the examples of FIGS. 9 and 10. In FIG. 9, a consumer 10 is walking around a retail store 650 with his or her portable electronic device 200 in one hand (or in his or her pocket, purse, handbag or the like) and with the article 300 in the other hand. The user can test the functionality of the article 300, such as taking photographs with a camera, taking video with a video camera, searching the Internet with a laptop or tablet, or the like. In this embodiment, geographical limitations are set on the user, as indicated by the dotted lines referred to as numeral 651. The geographical limitations in this embodiment surround the store 650, so that if the user were to leave the bounds of the retail store, the user would also be leaving the bounds of the geographical area, and thus be failing to comply with the access limitations set by the anti-theft system 500.

FIG. 10 illustrates another embodiment of the geographical limitations or the predefined geographic area within which the consumer is required to remain while having free access to the article 300. In this embodiment, the predefined geographical area 661 within which the consumer must remain while having access to the article 300 extends beyond the bounds of the retail store 660. Thus, in this embodiment the consumer can actually leave the store with the article 300 to test the functionalities of the article 300 outside of the store 660. This can be beneficial if the article 300 is a camera and the user wants to test its picture quality when taking pictures outdoors, or if the article 300 is clothing and the consumer wants to see how the consumer looks in the clothing in natural lighting. There are countless reasons why a consumer may want to take an article 300 outside of a store prior to purchase thereof. The inventive system enables such to take place in a safe and monitored environment.

Furthermore, although FIGS. 9 and 10 are the only pictorial illustrations of the geographic limitations, others may include enabling the consumer to carry the article 300 only in a specified part of the store. Thus, an area of a 10 foot radius, 20 foot radius, 30 foot radius or the like may be used as the geographical area within which the article 300 must remain while under the consumer's care. This may be beneficial if the store is extremely large, has multiple floors, has a changing area where the consumer may attempt to hide the article 300 from view for stealing, or the store is simply overly concerned with theft of merchandise based on historical data or the like. The geographical area may be bigger or smaller than that illustrated, and may change depending on the risk level of the consumer. Thus, if the consumer is approved, but the risk level is deemed relatively high on the approved scale, the geographic area within which the consumer may be permitted with the article 300 may be smaller than for a consumer carrying the same article 300 who has a relatively low risk level.

There are many ways that the anti-theft system 500 can monitor and track the location of the article 300 when it is being accessed by a consumer to ensure that the article 300 does not leave the hounds of the predefined geographic area 651, 661. For example, the anti-theft system 500 may include an operably coupled electronic article surveillance (EAS) beacon that emits an electromagnetic field that a corresponding security tag, that is coupled to the article 300 detects. The electromagnetic field can correspond to the predefined geographical area within which the article 300 is desired to remain. When the security tag coupled to the article 300 leaves the predetermined geographic area 651, 666, an alarm will sound, or a signal will be transmitted to the anti-theft system 500 ordering the anti-theft system 500 to charge the price of the article to the consumer's accounts, as discussed above and in more detail below. In such an embodiment, as long as the security tag or transponder is detecting the electromagnetic field of the EAS beacon, the anti-theft system 500 will be informed that the article 300 remains within the predefined geographical area. In other embodiments, the article 300 may have a global positioning system (GPS) affixed thereto that communicates with the anti-theft system 500 to track, continuously or on a set schedule, the location of the article 300 and ensure that it remains within the predefined geographical area. In yet another embodiment, the article 300 may include an RFID tag or other transponder that initiates an alarm or a signal to the anti-theft system 500 if the article 300 passes through a gate positioned at the entrance/exit of the retail store. This gate/transponder system is commonly used in retail store environments to prevent theft and can be incorporated into the inventive system.

As mentioned above, in certain embodiments upon the consumer taking the article 300 to a location that is outside of the predefined geographical area, the anti-theft system 500 will be directed to charge the price of the article 300 to the user's financial accounts using the earlier collected financial account data. If this takes place, in certain embodiments a notification will be sent to the consumer's portable electronic device 200 informing the consumer that the price of the article 300 has been charged to the consumer's account. This can be in the form of a receipt for purchase (which will enable the consumer to return the article 300 if, for example, the user accidently left the geographical area but had no intent to steal or purchase the article 300). However, even if the user did not have financial account data that was accessed by the anti-theft system 500, the anti-theft system 500 will still have identifying information about the consumer so that proper legal action can be taken against the consumer for the theft.

In certain embodiments, in order to keep the consumer informed of the bounds of the geographic area, the portable electronic device 200 may emit a sound, flash a light, or transmit any other type of signal to the consumer to inform the consumer that he or she is near the geographic area boundary and should be careful not to stray too much further from the security apparatus 501. Furthermore, in some embodiments while the consumer has the article 300 in his or her possession, the portable electronic device may display a map of the retail store with an indication of the location of the consumer as well as an indication of the geographic area within which the consumer must remain while having access to the article 300. This can assist the consumer in properly complying with the access limitations if he or she so desires. Of course, the above are for example only and any other manner of informing the consumer of the exact bounds of the geographic area or informing the consumer when he or she is near the bounds of the geographic area can be used.

Furthermore, it is appreciated that a consumer may accidentally take the article 300 outside of the predefined geographical area. Thus, in certain embodiments upon the anti-theft system 500 detecting that the article 300 is outside of the predefined geographical area, a notification will be sent to the consumer's portable electronic device 200 warning the consumer that the consumer's account will be charge the price of the article unless the article 300 is returned to the predefined geographic area (or to the anti-theft system 500) within a specific period of time. In certain embodiments, this can include starting a timer upon the notification being sent to the portable electronic device, and, upon expiration of the timer and the article 300 not being returned to the predefined geographic area, automatically charging the price of the article 300 to the account. This will provide the consumer who accidently takes the article 300 outside of the predefined geographic area an opportunity to return the article 300 to the predefined geographic area before making, an assumption that the consumer has stolen the article 300 and should be charged the price of the article 300.

As noted above, in addition or as an alternative to the predefined geographic limitations that can be set upon the consumer's unrestricted access to the article 300, the anti-theft system 500 may set temporal limitations on the consumer's unrestricted access to the article 300. As noted above, in certain embodiments the temporal and geographic limitations may be set simultaneously such that both must be complied with to avoid being charged the price of the article 300 or to avoid having a negative reflection on the consumer's risk profile as discussed below with regard to steps 926 and 927. In other embodiments, only one of the temporal and geographic limitations may be used. A determination as to whether to use one or both of the temporal and geographic limitations may be determined by the anti-theft system 500 based on the consumer's risk level.

Thus, returning to step 918, the anti-theft system 500 determines whether the consumer has returned the article 300 to the anti-theft system 500. If the answer is no, a clock is started to keep track of the amount of time that the consumer has had the article 300 separated from the anti-theft system 500. In certain embodiments, the clock may count down and may be displayed on the article 300 or on the portable electronic device 200 so that the consumer can be constantly aware of the amount of time remaining for the consumer's unrestricted access to the article 300 before the consumer will be charge the price of the article 300. The amount of time on the dock can vary depending on the type of product being viewed by the consumer, the consumer's risk level, or the store's desire to enable more or less time for a consumer to view a product based on preference. At step 919, a determination is made regarding whether the dock is close to expiring. In certain embodiments, if the clock is close to expiring, at step 921 a warning is transmitted to the consumer's portable electronic device 200 (or to the article 300 directly) indicating the amount of time remaining. The warning can be an audible sound, a flashing light, a vibration or the like. After this warning is transmitted, the consumer may be able to request additional time. The additional time request may be reviewed by the anti-theft system 500 and another risk assessment may be conducted to determine whether or not to allow the extra time.

If at step 919 it is determined that the clock is not close to expiring, the process continues to step 920 where it is determined whether the clock has already expired. Of course, in certain embodiments steps 919 and 920 can be accomplished simultaneously. If the clock has not expired, the process goes back to steps 915 and/or 918 whereby the consumer is able to walk around the store with the article 300 and it is determined whether the consumer has returned the article 300. If the clock has expired, a notification is sent to the consumer's portable electronic device 200 informing the consumer that the article 300 needs to be returned. Again, at this time the consumer may request additional time, which request can be analyzed for risk by the anti-theft system 500. Furthermore, in certain embodiments a first request for additional time may be granted automatically as long as the article 300 is still located within the store (as can be detected in the manners discussed above with regard to the geographic area detection). However, if the notification is submitted, the consumer does not request additional time or no additional time is granted, and another predefined period of time goes by (such as, for example, 1 minute, 2 minutes, 3 minutes, 4 minutes, 5 minutes, 10 minutes, etc.), the anti-theft system 500 may charge the price of the article 300 to an account of the consumer. In other embodiments, the price of the article 300 may be charged to an account of the consumer immediately upon expiration of the time.

Thus, in accordance with embodiments of the present invention, the anti-theft system 500 may send the consumer updates, via their portable electronic device 200, regarding its continued permitted access to the article 300 until the article 300 is properly placed backed in the anti-theft system 500 and locked/secured. As discussed in more detail below, if the article 300 is not returned to the anti-theft system 500 in accordance with the access limitations, the consumer may be given a brief reprieve, may be granted a more substantial extension if so requested, or may be deemed to have purchased the article 300, at which time the consumer's account (s) will be charged the price of the article 300. In certain embodiments, if the consumer's account(s) are charged the price of the article 300, an automated receipt may be generated and transmitted to the portable electronic device 200 via, for example without limitation, email, facsimile, first-class mail, voice message, instant message, text message, SMS, MMS, display directly onto a display device of the portable electronic device 200, or the like.

Furthermore, in certain embodiments the anti-theft system 500 (or the server 502) may send the consumer coupons, additional product information, marketing materials, promotional materials or the like by transmitting the same to the portable electronic device 200 or to the article 300 for display after the consumer has the article 300 in the unsecured state for a pre-defined period of time. In certain instances, it may be determined that the longer the consumer has the article 300 in the unsecured state, the less likely it is that the consumer will purchase the article. Thus, in some embodiments after the consumer has had the article 300 in the unsecured state for ten minutes, twenty minutes, thirty minutes or any other pre-defined period of time desired, the anti-theft system 500 or the server 502 can transmit coupons, product information, marketing materials or promotional materials to the portable electronic device 200 or to the article 300 to entice that consumer to purchase the article 300. Such action by the anti-theft system 500 may give the consumer the extra push that he or she needs to complete the purchase.

Referring back to step 918, as noted above this is where it is determined whether the consumer has returned the article 300 to the anti-theft system 500. If the answer is yes, the security apparatus 501 of the anti-theft system 500 can re-secure the article 300 as indicated at step 923. The re-securing step can be accomplished automatically upon the consumer placing the article 300 back into the anti-theft system 500. Alternatively, upon the consumer placing the article 300 back into the anti-theft system 500, the consumer may be prompted to bring the portable electronic device 200 into close proximity with the anti-theft system 500 (or with the wireless communication device 503 of the anti-theft system 500), which will then result in the anti-theft system 500 being directed to re-secure the article 200 by transitioning the anti-theft system 500 back into the secured state.

In certain embodiments, upon the article 300 being re-secured by the anti-theft system 500, a notification may be transmitted to the portable electronic device 200 and/or to the server 503 indicating that the article 300 was returned, as indicated at step 924. This may include providing a receipt or other proof that the consumer can use to prove that the article 300 was returned in accordance with the access limitations to release the consumer from any financial obligations associated with the article 300. At step 925, the system determines whether the article 300 was returned prior to the clock expiring (when the temporal limitations are used as the access limitations) and/or without the consumer leaving the pre-defined geographic area (when geographic limitations are used as the access limitations). As indicated at step 926, if it is determined that the article 300 was not returned prior to the clock expiring, or it is determined that the consumer and/or article 300 left the predefined geographic area, the anti-theft system 500, or more specifically the server 502, will update the consumer's profile to increase the consumer's risk level.

In other words, if the consumer does not comply with all access limitations, the consumer's profile in the anti-theft system 500/server 502 will be updated to indicate that the consumer's risk level has increased relative to the consumer's risk level when the anti-theft system 500 transitioned to the unsecured state, so that the next time the consumer attempts to access a product using the anti-theft system 500, this elevated level of risk will be analyzed in determining if the risk level of the consumer should be approved or disapproved.

Furthermore, as indicated at step 927, if it is determined that the article 300 was returned to the anti-theft system 500 prior to the clock expiring and without exiting the geographic area, the consumer's profile in the anti-theft system 500/server 502 will be updated to indicate that the consumer has complied with access limitations and the consumer's risk level will be decreased. This may result in increasing privileges of the consumer when the consumer again accesses an article using the anti-theft system 500, such as by increasing, the time limit, increasing the area of the predefined geographic area, or the like.

As noted above, upon the consumer returning the article 300 to the anti-theft system 500, the anti-theft system 500 is directed to transition from the unsecured state to the secured state, thereby re-securing the article 300. At this point, other consumers can approach and unlock the article 300 using the anti-theft system 500 and the techniques disclosed herein without first being required to purchase the article 300. In certain embodiments, upon the consumer returning the article 300 to the anti-theft system 500, product data relating to the article 300 is automatically transmitted to the portable electronic device 200. Thus, in instances in which the consumer decides not to purchase the article 300, the store will attempt to maintain contact with the consumer by transmitting the product data to the consumer s portable electronic device 200. This will enable the consumer to keep a list of the products that he/she viewed, provide the consumer with an easy way to purchase the product later (such as via the portable electronic device 200 directly), and keep the product on the consumer's mind for a possible later purchase. This will also enable the retail store, possibly through the anti-theft system 500 and the server 502, to transmit coupons and other marketing materials to the portable electronic device 200 that are targeted to the consumer and the product.

Furthermore, in certain embodiments upon the consumer returning the article 300 to the anti-theft system 500, the consumer's browsing data will be automatically transmitted to a retailer database, which may be stored in the server 502 of the anti-theft system 500, or some other server. More specifically, in such embodiments upon the consumer returning the article 300 to the anti-theft system 500, the user will be prompted to position the portable electronic device 200 into proximity with the anti-theft system 500. Such close proximity positioning between the portable electronic device 200 and the anti-theft system 500 will initiate communication, such as via NFC, therebetween and will automatically transmit the consumer's browsing history to the retailer database. Specifically, as the consumer is browsing products in the retail store, a log of the products viewed by the consumer will be temporarily stored in the portable electronic device 200 or in the server 502. This can be accomplished via wireless communication, such as NFC, between the portable electronic device 200 and each product/article viewed or between the article 300 and each additional article viewed while the consumer has access to/possession of the article 300. Upon the consumer re-securing the article 300 in the anti-theft system 500, any data regarding browsing history that was temporarily (or permanently) stored on the portable electronic device 200 can be transmitted to the anti-theft device 500, to the server 502, or to some external server. The retail store can use this browsing history data to send targeted marketing materials, coupons and the like to the consumer at any desired time to entice the consumer to purchase one or more of the articles that the consumer had been browsing.

In addition to browsing history, other data/information that can be transmitted to and stored by the anti-theft system 500 and/or server 502 includes how long the consumer viewed the article 300, what other products/articles the consumer viewed while having unlocked access to the article 300, which salespeople did the consumer speak with, which articles did the consumer sample but were never purchased, etc. All such information would be uploaded, and stored in, for example, the consumer database 605 of the server 502 of the anti-theft system 500. In one embodiment, the retailer may use this information, possibly in conjunction with data mining techniques, to identify consumers to send discounts, coupons, and/or other marketing materials to. These discounts and/or other marketing materials may be sent in real-time or close to it, or they may be sent at a later time or a later date. Either way, this information enables retailers to actively manage inventory levels throughout the season, hopefully avoiding an across the board sweeping discount. Thus, using the techniques described herein, targeted marketing materials can be transmitted to the portable electronic device 200 based on the consumer's browsing history to entice the consumer to purchase that product or others either while the consumer is still in the store or at some later date.

Figure 11A:
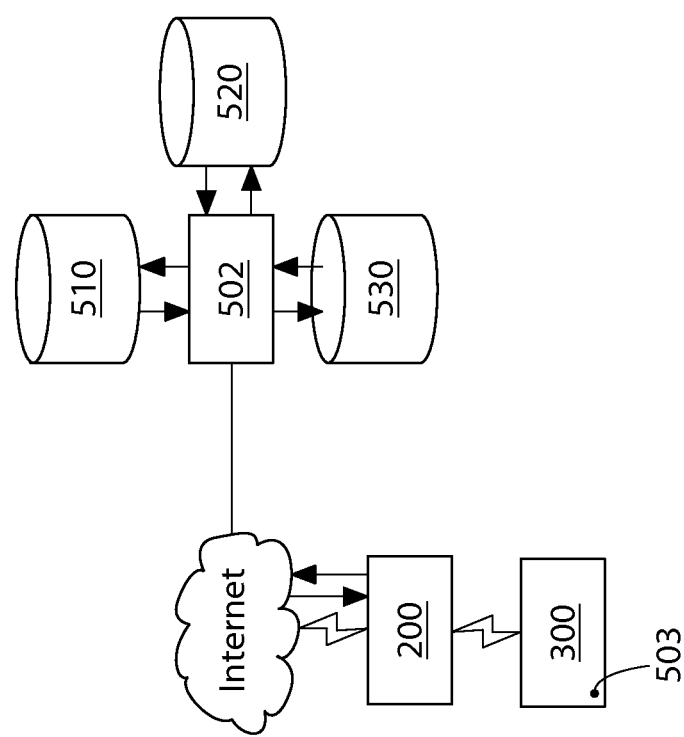
FIG. 11A is a schematic diagram illustrating operable communication between a portable electronic device, an article, and a server in accordance with one embodiment of the present invention.
Figure 11B:
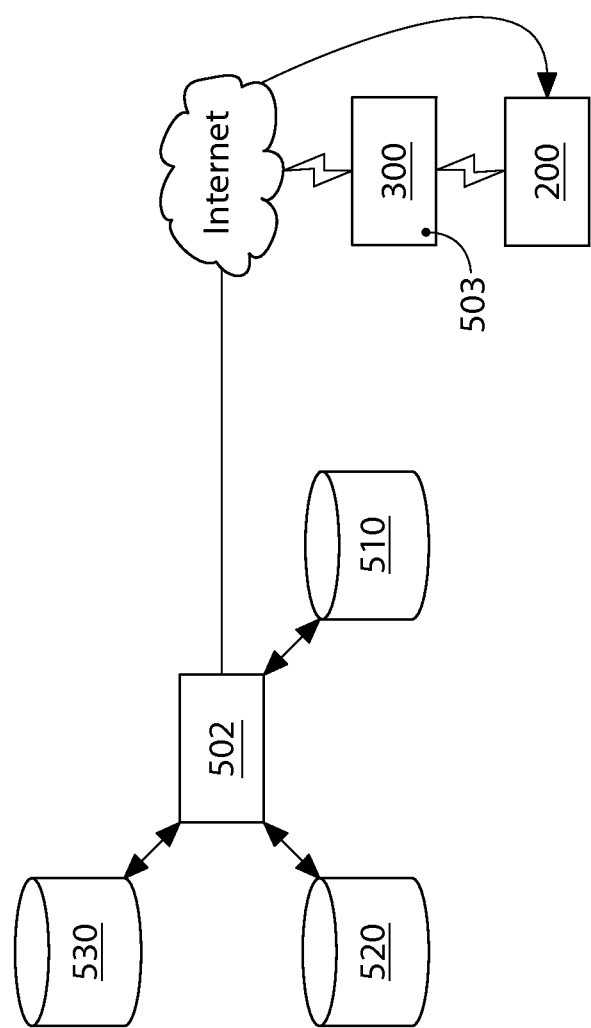
FIG. 11B is a schematic diagram illustrating operable communication between a portable electronic device, an article, and a server in accordance with another embodiment of the present invention.

Referring to FIGS. 11A and 11B, two different ways in which communication can be achieved between the portable electronic device 200, the article 300 and the server 502 will be described. Referring first to FIG. 11A, in one embodiment the portable electronic device 200 can communicate, preferably via NFC technologies but alternatively also via any of the other technologies described above including WiFi, I/O, Bluetooth, Sonar and the like, with the wireless communication device 503. The wireless communication device 503 can be coupled directly to the article 300, or it can be coupled directly to the security apparatus 501 (not illustrated) of the anti-theft system 500. During the communication between the portable electronic device 200 and the wireless communication device 503, certain information and data can be transferred between the two devices. In the embodiment of FIG. 11A, at this point the portable electronic device 200 may communicate, via the Internet, with the server 502 (which can form a part of the anti-theft system 500 or can be a remote server that is separate from, but in operable communication with, the anti-theft system 500). Information/data can be transmitted to the server 502 from the portable electronic device 200 and from the server 502 to the portable electronic device 200, such as any of the data discussed herein above. Furthermore, as noted above in certain embodiments additional information, such as information about the consumer, can be retrieved by the server 502 from additional databases 510, 520, 530, which may include a social network database 510, a payment database 520 and any other database 530 containing information about the consumer that may be relevant to the consumer's risk levels as discussed above (i.e., an educational database, an occupational database, an arrest history database). Upon analyzing the information, the server 502 can then transmit information back to the portable electronic device 200 (such as approval and disapproval signals, product information and the like).

FIG. 11B is the same as FIG. 11A except that the communication between the portable electronic device 200 and the server 502 is achieved entirely through the wireless communication device 503. Thus, after initial communication is achieved between the wireless communication device 503 and the portable electronic device 200, the wireless communication device 503 will communicate with the server 502, which will in turn communicate with the databases 510, 520, 530 to gather information as needed to make a proper risk assessment. The decision from the server 502 regarding approval or disapproval can be transmitted either directly to the portable electronic device 502 via WiFi or the like, or can be transmitted to the wireless electronic device 503, which can then transmit the information to the portable electronic device 200 via NFC, RFID, WiFi or the like. Furthermore, various combinations of the communications between the devices as depicted in FIGS. 11A and 11B can also be utilized.

In certain embodiments, upon the portable electronic device 200 initially communicating with the anti-theft system 500, product data relating to the article 300 is transmitted to the consumer's portable electronic device 200 or to the article 300 itself for the consumer's viewing. Furthermore, in certain embodiments upon the communication initiating between the portable electronic device 200 and the anti-theft system 500, the server 502 for the anti-theft system 500) retrieves information relating to the consumer both from the portable electronic device 200 of the consumer and from the one or more databases 510, 520, 530. Retrieving information locally from the portable electronic device 200 and non-locally from the databases enables the server 502 (or the anti-theft system 500) to retrieve the maximum amount of data about the consumer that is available both directly on the consumer's portable electronic device 200 and externally in the cloud. Thus, this can give the server 502 (or the anti-theft system 500) a good overall picture of who the consumer is, such as what the consumer's hobbies are (i.e., sports, rock climbing), what the consumer's occupation is (businessperson, caretaker, attorney, entrepreneur, athlete, financial analyst), what the consumer's gender is, what the consumer's ethnicity is, and the like.

The server 502 can use all of this information about the consumer to then tailor the product data that is provided to the consumer based on this information. Thus, if the article is a camera and the person is a rock climber, the product data can include photographs of people climbing rocks or mountains. Furthermore, the product data can include persons having the same ethnic background and/or the same gender as the consumer. As another example, if the article 300 is a shirt, the product data can include photographs of a person having similar ethnic background and gender as the consumer wearing the shirt.

Tailoring the information/data that is provided to the consumer can also be advantageous when the article is a service rather than art actual product. For example, the consumer may walk past a movie theater and place the consumer's portable electronic device 200 into proximity with a movie billboard. In response, data and information about the movie may be transmitted to the portable electronic device 200, including product/movie data that is tailored to that particular consumer based on the consumer's profile deciphered from consumer data retrieved from the portable electronic device 200 directly and from the various accessible databases in the cloud. Product data about any service can be tailored to a particular consumer based on the consumer profile created/deciphered from the consumer data retrieved form the portable electronic device 200 and from the databases in the cloud, including salon services, health care provider services, food services, real estate services, and any other type of service that is offered by an individual or a business enterprise. Tailoring product data to a consumer's interests, background and the like may make the consumer more likely to use the particular service with which the product data is associated.

In yet another embodiment, multiple products can transmit information to each other or to the portable electronic device 200 as a consumer walks around the store with the article 300. Specifically, in certain embodiments if the consumer is walking around the store while carrying the article 300 and walks near another product or article, information about that second product or article may be transmitted to the portable electronic device 200 or to the article 300. Walking near another product may mean walking near enough to another product for NFC to be possible, such as being within 0-40 cm of the second product. In certain embodiments, the article 300 may be a camera and the second article may be a printer. Upon it being detected that the camera is within a predefined distance from the printer (i.e., 10-40 cm, 15-30 cm, 18-22 cm), product data relating to the printer may be transmitted to the portable electronic device 200 or to the camera. In certain embodiments, this product data may include a marketing promotion that details the benefits of using the camera and the printer (i.e., the first article and the second article) together.

In another embodiment, the article 300 (or the wireless communication device 503) may also receive and identify signals belonging to the wireless device of an employee (an "Employee WD"). After receiving the signals, the article 300 or wireless communication device 503 would record any sudden movements or changes in direction or behavior by the consumer as the result of being approached by the employee. This information would be transmitted to the remote server 502 (e.g., the transmission could occur once the article 300 was securely placed back in the anti-theft system 500 or the transmission could be periodically as the consumer retains access to the article 300). Such information may be subjected to data mining for purposes of determining employee performance.

Figure 12C:
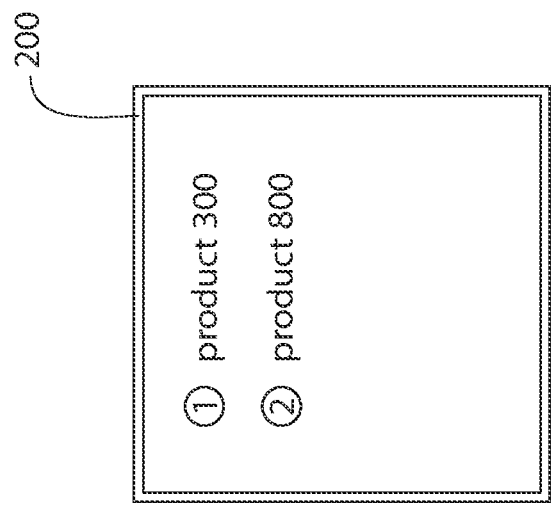
FIGS. 12A-C are a collection of schematic diagrams illustrating a method of purchasing articles in accordance with an embodiment of the present invention.
Figure 12B:
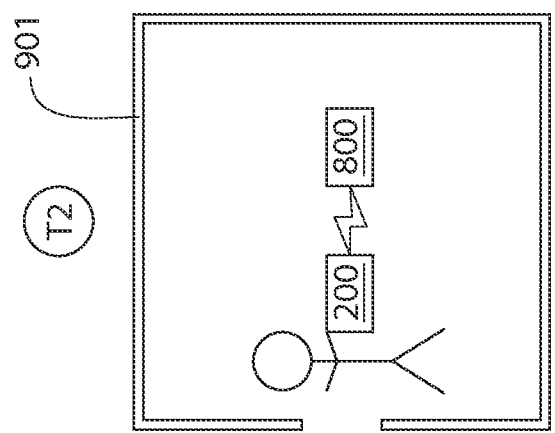
Figure 12A:
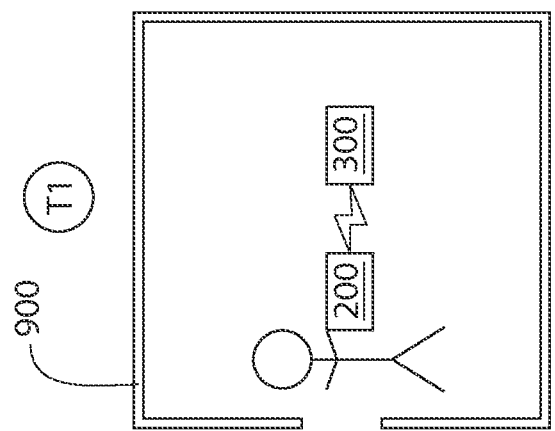

Referring to FIGS. 12A-12C, another embodiment of the present invention will be described. The embodiment of FIGS. 12A-12C enables a consumer to create an electronic shopping list as the consumer walks from store to store. Specifically, in certain instances a consumer is shopping for a particular item, for example a pair of black shoes. The consumer may go to store A and find a pair of black shoes that he or she likes, but the price may be a little bit higher than he or she desires to pay. The consumer may then go to store B and find another pair of black shoes that he or she likes a little bit less than the pair from store A, but that is at a better price point. Using the inventive system, a user can store both the pair of shoes from store A and store B on his or her portable electronic device, and can then decide whether to purchase none, one or both of the pairs of shoes at a later time. This can be beneficial if a consumer goes to multiple stores, say ten stores, in a single day. The consumer may decide at the end of the day that he or she prefers the pair of shoes from the very first store visited. However, this very first store may at this point be miles away from the consumer's current location. Using the inventive system, the consumer can easily purchase the pair of shoes from the first store directly on his or her mobile phone.

FIG. 12A illustrates a consumer having a portable electronic device 200 in a first retail store 900 at time T1. The portable electronic device 200 is in wireless or hardwired communication with an article 300 in the first retail store 900. Due to this communication, which can be NFC or any other communication discussed herein, the portable electronic device 200 can receive and store first product data related to the article 300. The first product data can be retrieved from a first retailer system, which may include a server that is owned and operated by the first retail store 900 or otherwise.

FIG. 12B illustrates the consumer with the portable electronic device 200 in a second retail store 901 at time T2. Time T2 is some time after time T1 and can be the same day as time T1 or a different day entirely. At time T2, the consumer brings the portable electronic device 200 into near field communication with a second article or product 800 at the second retail store 901. As a result, the portable electronic device 200 receives and stores second product data related to the second product 800. The second product data can be retrieved from a second retail system, which may include a server that is owned and operated by the second retail store 901 or otherwise.

Referring now to FIG. 12C, next, using the inventive system, a list of products is generated based on the first and second product data (and possibly additional product data if additional products were viewed). The list of products is then displayed on the portable electronic device 200 for viewing and possible selection by the consumer. Then, if the consumer decides to purchase one or more of the items, the system transmits information as follows. Specifically, if the consumer decides to purchase the first article 300, the user selects the first product 300 from the list of products on the portable electronic device 200. In response, the system transmits a purchase request that includes purchase data for the first product to the first retailer system. Similarly, if the consumer decides to purchase the second article 800, the user selects the second product 800 from the list of products on the portable electronic device 200. In response, the system transmits a purchase request that includes purchase data for the second product to the second retailer system. Thus, the system is capable of communicating with multiple retailer systems.

Figure 13:
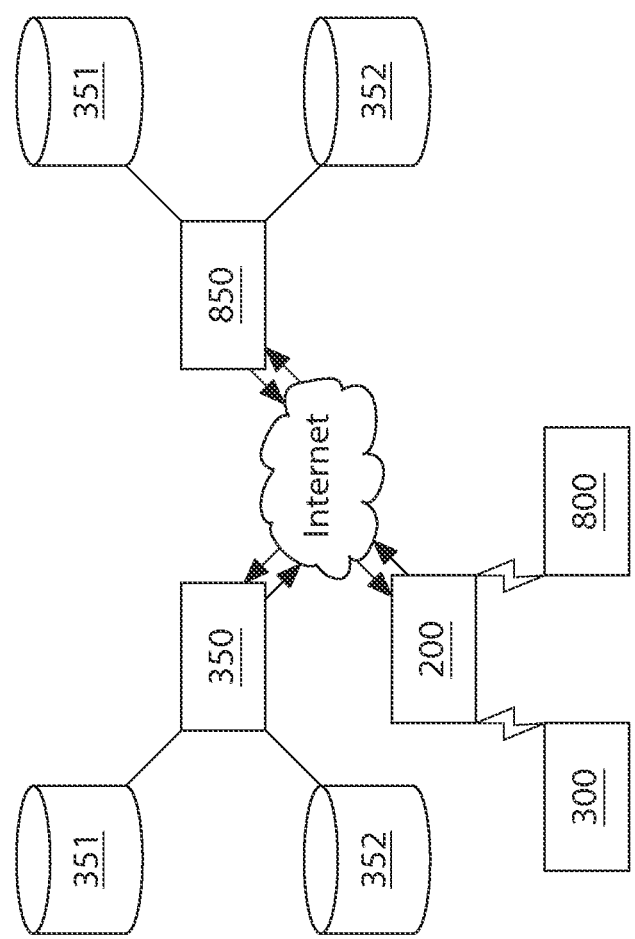
FIG. 13 is a schematic diagram illustrating communication between a portable electronic device and a first and second retailer system.

Referring to FIG. 13, the communication between the various components will be described. As noted above, the portable electronic device 200 is in operable communication with the first article 300 and the second article 800. In the exemplified embodiment, the communication is achieved via NFC, but any other types of communication disclosed herein can be used. Upon communication being established between the portable electronic device 200 and the first article 300, the portable electronic device 200 communicates with the first retailer system 350, through WiFi or otherwise, via the Internet. The first retailer system 350 may comprise one or more servers and other components. The first retailer system 350 can pull data from the portable electronic device 200 and from one or more external databases or servers 351, 352. Specifically, the first retailer system 350 may pull consumer data about the consumer from the portable electronic device 200 and from the first retailer system 350 in order to generate a profile of the consumer so that product data transmitted to the portable electronic device 200 from the first retailer system 350 can be tailored to the particular consumer. The data retrieved from the portable electronic device 200 can be considered local consumer data and the data retrieved from the one or more databases 351, 352 can be considered non-local consumer data. The non-local consumer data may be based on the local consumer data, meaning that the initial information about the consumer, such as identifying information, is retrieved from the portable electronic device 200, which then enables the first retailer system 350 to retrieve non-local additional data about the consumer. After retrieving the local and non-local data, the first retailer system 350 generates tailored first product data based on the local and non-local consumer data and can transmit that data to the portable electronic device 200 for display locally on the screen, through an application, or via electronic mail, text message, voicemail or the like.

Similarly, upon communication being established between the portable electronic device 200 and the second article 800, the portable electronic device 200 communicates with the second retailer system 850, through WiFi or otherwise, via the Internet. The second retailer system 850 may comprise one or more servers and other components. The second retailer system 850 can retrieve data from the portable electronic device 200 and from one or more external databases or servers 851, 852. Specifically, the second retailer system 850 may retrieve consumer data about the consumer from the portable electronic device 200 and from the second retailer system 850 in order to generate a profile of the consumer so that product data transmitted to the portable electronic device 200 from the second retailer system 850 can be tailored to the particular consumer. The data retrieved from the portable electronic device 200 can be considered local consumer data and the data retrieved from the one or more databases 851, 852 can be considered non-local consumer data. The non-local consumer data may be based on the local consumer data, meaning that the initial information about the consumer, such as identifying information, is retrieved from the portable electronic device 200, which then enables the second retailer system 850 to retrieve non-local additional data about the consumer. After retrieving the local and non-local data, the second retailer system 850 generates tailored first product data based on the local and non-local consumer data and can transmit that data to the portable electronic device 200 for display locally on the screen, through an application, or via electronic mail, text message, voicemail or the like.

In certain embodiments, the first and second product data may be tailored for the consumer based on information relating to the consumer that is retrieved from one or more databases and from the portable electronic device 200. Specifically, the system may retrieve information relating to the consumer from one or more databases, as has been described herein previously. The system may then generate the tailored first product data based on the retrieved information and transmit the tailored product data to the portable electronic device 200 for display. Thus, the content provided to the consumer can be tailored based on the consumer's hobbies, likes, dislikes and any other information that can be obtained from the databases, such as servers located in the cloud. The system or server is capable of analyzing the consumer's profile based on the obtained data and selecting the appropriate product data that matches the consumer's profile based on ethnicity, hobbies, gender, parental and marital status and the like.

Figure 14:
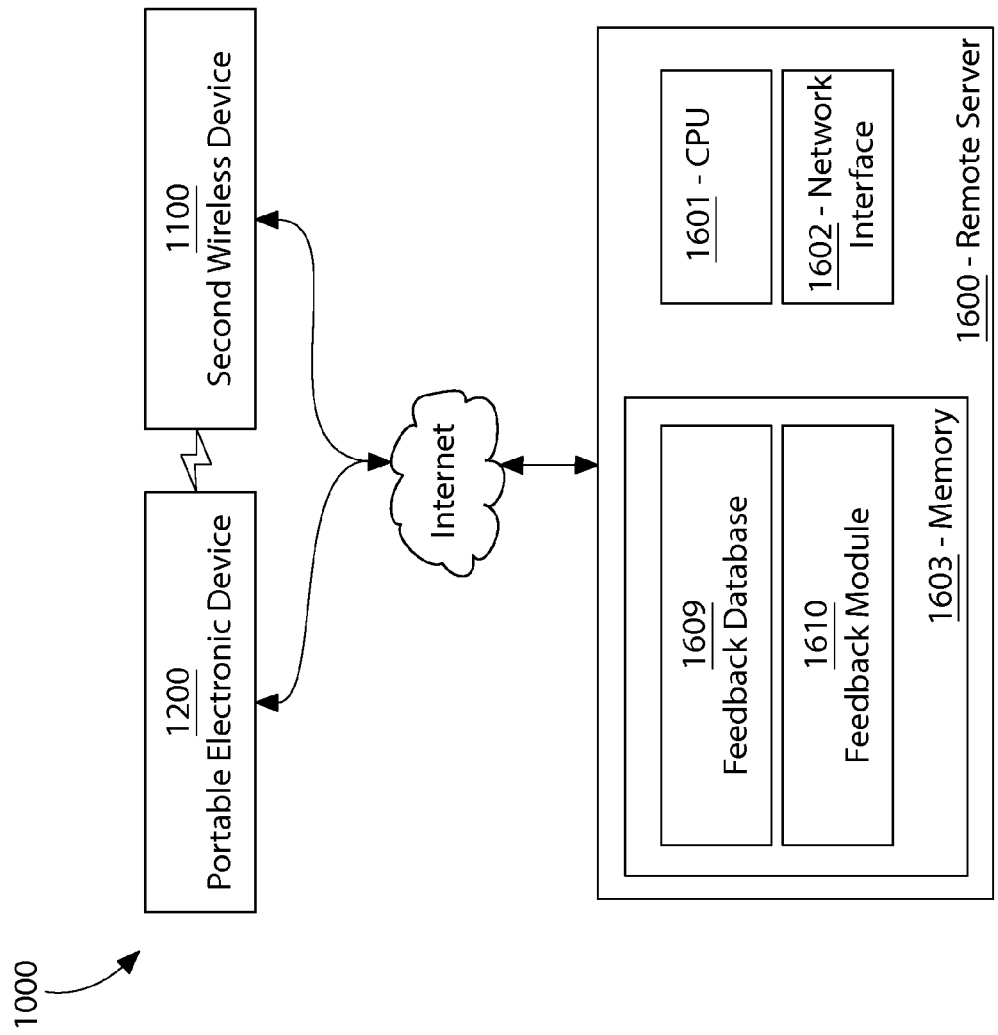
FIG. 14 is a schematic diagram of a system for receiving consumer feedback according to one embodiment a the present invention.

Referring to FIG. 14, a schematic diagram of a system for receiving consumer feedback 1000 according to one embodiment of the present invention is illustrated, in accordance with the exemplified embodiment, a portable electronic device 1200, which can be any type of device discussed above with regard to the portable electronic device 200, may be used as a consumer feedback device for various retail establishments, such as, but not limited to restaurants, bars, sporting venues, and consumer products stores. Further, according to one embodiment of the present invention, the portable electronic device 1200 may also be used as a consumer feedback device for polling and surveys, such as, but not limited to political polls and surveys regarding new products and services.

As shown in FIG. 14 and discussed in more detail below, both the portable electronic device 1200 and second wireless device 1100 are configured to transmit consumer feedback, either directly or indirectly, to a remote server 1600 for storage and further processing. As also discussed in more detail below, the consumer feedback may be generated by the portable electronic device 1200 and/or the second wireless device 1100, the second wireless device 1100 being located at the retail establishment, or polling/survey location. Moreover, it should be noted that, unlike the embodiments discussed in detail above, the embodiment of FIG. 14 does not necessarily, but may, comprise an article of merchandise 300 or an anti-theft system 500.

The portable electronic device 1200 of FIG. 14 is similar to those discussed above. Therefore, a detailed explanation will not be duplicated. Similarly, the second wireless device 1100 is also similar to those discussed above. Specifically, the second wireless device 1100 comprises a properly programmed RFID tag/reader, NFC tag/chip, or RF, electromagnetic, Bluetooth, WIFI, cellular, I/O, DIDO, infrared, or sonar integrated circuit.

According to one embodiment, the second wireless device 1100 resides within its own housing and may comprise its own additional operable connected and properly programmed electronic components (e.g., the processor, the memory device, the power supply, network interface, etc.). For instance, the second wireless device 1100 may be an RFID reader or NFC chip that is part of a poster or display that is located at the entrance, exit, seat, or in close proximity to a particular product at a retail establishment or polling/survey location. Nonetheless, it should be noted that the invention is not so limited, and in alternate embodiments the second wireless device 1100 may take the form of any other means that can be connected back to the remote server 1600 (either wirelessly or via a direct wire connection) to provide the consumer's feedback. Further, the second wireless device 1100 is properly programmed to utilize the internal components (e.g., the processor, the memory device, the power supply, network interface, etc.) of an electronic device located at the retail establishment or polling/survey location (e.g., a cash register, a security device, a consumer product 300, etc.), or the second wireless device 1100 may comprise its own additional operable connected and properly programmed electronic components to perform the functions and processes described herein.

The remote server 1600 of the embodiment exemplified in FIG. 14 is similar to the server 502 discussed above. Additionally, the memory 1603 of the remote server 1600 of FIG. 14 further comprises a feedback database 1609 and a feedback module 1610. It should be noted that although not exemplified in FIG. 14, the remote server 1600 may comprise any number of the databases and modules exemplified in FIG. 4 and as discussed above.

A method of receiving consumer feedback utilizing the embodiment of FIG. 14 begins when a consumer positions their portable electronic device 1200 in close proximity to a second wireless device 1100 at a particular retail establishment or polling/survey location. As noted above, the process may be initiated by the portable electronic device 1200 or by the second wireless device 1100. For instance, when the portable electronic device 1200 is in close proximity to the second wireless device 1100, one of the portable electronic device 1200 or the second wireless device 1100 generates and transmits an initiation signal to the other of the portable electronic device 1200 or the second wireless device 1100. When the other of the portable electronic device 1200 or the second wireless device 1100 receives the initiation signal, the process begins. Stated simply, after the consumer positions their portable electronic device 1200 in close proximity to the second wireless device 1100, a means for providing consumer feedback is initiated.

It should be noted that the present invention is not limited to any specific means for providing consumer feedback. According to one embodiment of the present invention, the means for providing consumer feedback is a portable electronic application residing on the portable electronic device 1200 that is initiated upon the portable electronic device 1200 receiving the initiation signal from the second wireless device 1100. However, the invention is not so limited, and in alternate embodiments, the means for providing consumer feedback may be a website that is automatically opened and routed to a particular IP address upon the portable electronic device 1200 receiving the initiation signal, or it may be an automatic link to a page for the retail establishment at a social website or via a portable electronic application such as Facebook®) (e.g., the user may automatically "like" the establishment or may provide their feedback at the particular page).

Further, according to one embodiment of the present invention, the initiation signal itself provides the consumer feedback (e.g., there may be multiple locations on a particular poster and depending on the location in which the portable electronic device 1200 is waived/positioned a different initiation signal is generated, such that the first location causes one of the portable electronic device 1200 and/or the second wireless device 1100 to generate a signal representing a good experience to be transmitted by one of the portable electronic device 1200 and/or the second wireless device 1100 to the remote server 1600, the second location a neutral experience, and the third location a poor experience). Additionally, according to another embodiment, the initiation signal may request an email address of the consumer such that upon receiving the email address, the remote server 1600 generates and transmits a consumer feedback email to the portable electronic device 1200. Therefore, as stated above, the means for providing consumer feedback may be initiated by the portable electronic device 1200, the second wireless device 1100, or both.

According to one embodiment of the present invention, the consumer feedback is a rating of an establishment, product, or service on a numerical scale. However, the invention is not so limited and in alternate embodiments the rating may be any other means, such as, but not limited to a color coded rating e.g., green, yellow, red), a verbal rating scale (e.g., good, bad, neutral), or an illustration rating scale. Further, in other embodiments, the consumer feedback may be a survey or poll completed by the consumer.

According to some embodiments of the present invention, after the means for providing consumer feedback is initiated by the portable electronic device 1200 and/or the second wireless device 1100, one of the portable electronic device 1200 and/or the second wireless device 1100 transmits the consumer feedback back to the remote server 1600 where it is stored in the feedback database 1609. It should be noted that the invention is not so limited, and in alternate embodiments the portable electronic device 1200 and/or the second wireless device 1100 may only transmit information back to the remote server 1600 (e.g., consumer email address), and the consumer feedback may be provided to the remote server 1600 at a later time. Further, in an alternate embodiment, the consumer feedback may be transmitted to the remote server 1600 by a third party device or website (e.g., a social networking site).

Upon receiving the consumer feedback, the remote server 1600 stores the feedback in the feedback database 1609. Further, the remote server 1600 may also store the feedback in other databases of the remote server 1600, such as, but not limited to the consumer database 1605. Thereafter, according to one embodiment of the present invention, the remote server

1600, using the feedback module 1610, may aggregate the consumer feedback with the consumer's profile stored within the consumer database 1605. This may be beneficial for marketing purposes for the retail establishment or for polling/survey data. Specifically, the retail establishment may use the consumer feedback for a variety of purposes, such as, but not limited to providing consumers with discounts or other promotional materials for their feedback.

For example, in one embodiment of the present invention, the consumer may have just finished a meal at a restaurant. On their way out, there may be a poster that comprises at least one second wireless device 1100 for receiving consumer feedback. When the consumer is leaving the restaurant, they may position their portable electronic device 1200 in close proximity to the poster and a means for providing consumer feedback is displayed on the portable electronic device 1200. The means for providing consumer feedback may be a rating of their meal and the particular restaurant, in which the consumer responds using their portable electronic device 1200. Upon completion, the portable electronic device 1200 transmits the consumer feedback to the remote server 1600 for further processing/storage.

For further example, in another embodiment of the present invention, the consumer could be browsing clothing in an apparel store. When the consumer finds a particular article of clothing they really like, the consumer may position their portable electronic device 1200 over a second wireless device 1100 located on the clothing stand. By waving of their portable electronic device 1200 over the second wireless device 1100, the consumer automatically "likes" that article of clothing via Facebook® and a positive consumer feedback signal is generated by the second wireless device 1100 and transmitted by the second wireless device 1100 to the remote server 1600 of the present invention for further processing.

Moreover, for yet another example of another embodiment of the present invention, the consumer could be at a sporting event and prior to leaving the consumer positions their portable electronic device 1200 over a second wireless device 1100 located in the seat in front of them. This initiates an email to be generated and transmitted to the consumer by the remote server 600, the email containing a survey relating to that particular sporting event. The spotting event may entice the consumer to fill out the survey by offering a discount off future tickets or other prizes/incentives.

Additionally, in another exemplary embodiment of the present invention, the consumer could position their portable electronic device 1200 by a particular poster or advertisement comprising a second wireless device 1100 for political candidate. Upon waving their portable electronic device 1200 by the second wireless device 1100, one of the portable electronic device 1200 or the second wireless device 1100 transmits a candidate approval signal back to the remote server 0600 for further processing. This may be beneficial for assessing the popularity of a particular political candidate.

As described above, systems and methods consistent with the invention provide a way for retail stores to prevent theft, while still permitting consumers to have increased access to the store's merchandise. For purposes of explanation only, certain aspects and embodiments are described herein with reference to the components illustrated in FIGS. 1-14. The functionality of the illustrated components may overlap, however, and may be present in fewer or greater number of elements and components. Further, all or part of the functionality of the illustrated elements may co-exist or be distributed among several geographically dispersed locations. For example, each "database" may be embodied as a software component, is hardware component, or a combination of a software component and a hardware component. Moreover, embodiments, features, aspects and principles of the present invention may be implemented in various environments and are not limited to the illustrated environments.

Further, the sequences of events described in FIGS. 1-14 are exemplary and not intended to be limiting. Thus, other process stages may be used, and even with the processes depicted in FIGS. 1-14, the particular order of events may vary without departing from the scope of the present invention. Moreover, certain process stages may not be present and additional stages may be implemented in FIGS. 1-14. Also, the processes described herein are not inherently related to any particular system or apparatus and may be implemented by any suitable combination of components.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method for providing consumers with access to an article, the method comprising:
   a) securing the article in a secured state using an anti-theft system, the anti-theft system alterable between the secured state and an unsecured state;
   b) the anti-theft system receiving, from a consumer's portable electronic device, consumer data relating to the consumer;
   c) analyzing the consumer data received by the anti-theft system to determine the consumer's risk level; and
   d) directing the anti-theft system to transition from the secured state to the unsecured state upon the consumer's risk level being approved;
   wherein the consumer data includes financial account data; wherein step c) comprises determining whether an account associated with the financial account data has available funds that are greater than or equal to a price of the article; and wherein step d) comprises directing the anti-theft system to transition from the secured state to the unsecured state upon determining that the available funds are greater than or equal to the price of the article; and
   wherein step d) is completed without charging the price of the article to the account.

2. The method of claim 1 wherein in step b), the consumer data is wirelessly transmitted to the anti-theft system from the consumer's portable electronic device using near field communication.

3. The method of claim 1 further comprising:
   e) upon the article exiting a predefined geographic area, automatically charging the price of the article to the account.

4. The method of claim 3 further comprising:
   f) upon the price of the article being charged to the account, sending a notification to the consumer's portable electronic device that the price of the article has been charged to the account.

5. The method of claim 1 further comprising:
   e) upon the article exiting a predefined geographic area, sending a notification to the consumer's portable electronic device that the price of the article will be charged to the account unless the article is returned to the predefined geographic area within a period of time.

6. The method of claim 5 further comprising:
f) starting a timer upon the notification being sent to the consumer's portable electronic device; and
g) upon expiration of the timer and the article not being returned to the predefined geographic area, automatically charging the price of the article to the account.

7. The method of claim 1 further comprising:
e) directing the anti-theft system to transition from the unsecured state to the secured state upon the consumer returning the article to the anti-theft system.

8. The method of claim 7 further comprising:
f) transmitting product data relating to the article to the consumer's portable electronic device upon the completion of step e).

9. The method of claim 7 further comprising:
f) transmitting browsing data of the consumer to a retailer database upon the completion of step e); and
g) transmitting targeted marketing materials to the consumer's portable electronic device based on the browsing data of the consumer.

10. The method of claim 7 wherein step c) further comprises storing a consumer profile comprising the consumer's risk level in a retailer database.

11. The method of claim 10 further comprising:
f) updating the consumer's risk level of the consumer profile to indicate less risk upon the consumer returning the article to the anti-theft system in accordance with access limitations provided to the consumer; and
g) updating the consumer's risk level to indicate more risk upon the consumer failing to return the article to the anti-theft system in accordance with the access limitations provided to the consumer.

12. The method of claim 1 further comprising:
e) transmitting product data relating to the article to the consumer's portable electronic device or to the article.

13. The method of claim 12 further comprising:
wherein step c) further comprises retrieving from one or more databases information relating to the consumer; and
wherein step e) further comprises tailoring the product data to the consumer based on the information retrieved from the one or more databases.

14. The method of claim 12 further comprising:
f) transmitting second product data relating to a second article to the consumer's portable electronic device or to the article upon a tag associated with the second article detecting that the article is within a predefined distance from the second article.

15. The method of claim 14 wherein the second product data includes a marketing promotion detailing benefits of using the article and the second article together.

16. The method of claim 1 further comprising:
e) transmitting access limitations to the consumer's portable electronic device, the access limitations being based on geographic or temporal constraints.

17. The method of claim 1 further comprising, upon the consumer's risk level being disapproved:
e) directing the anti-theft system to remain in the secured state;
f) transmitting a disapproval signal to the consumer's portable electronic device; and
g) transmitting an assistance signal to a sales representative's portable electronic device.

18. A non-transitory computer-readable storage medium encoded with instructions which, when executed on a processor, performs a method for providing consumers with access to an article, the method comprising:
a) securing the article in a secured state with a security apparatus, the security apparatus alterable between the secured state and an unsecured state;
b) receiving consumer data related to a consumer from a portable electronic device carried by the consumer;
c) analyzing the consumer data to determine the consumer's risk level; and
d) directing the security apparatus to transition from the secured state to the unsecured state upon the consumer's risk level being approved;
wherein the consumer data includes financial account data; wherein step c) comprises determining whether an account associated with the financial account data has available funds that are greater than or equal to a price of the article; and wherein step d) comprises directing the security apparatus to transition from the secured state to the unsecured state upon determining that the available funds are greater than or equal to the price of the article; and
wherein step d) is completed without charging the price of the article to the account.

19. A system for providing consumers with access to an article comprising:
an anti-theft system comprising a security apparatus and a server having a processor, the security apparatus securing the article in a secured state and being alterable between the secured state and an unsecured state;
a portable electronic device carried by a consumer; and
wherein the processor is configured to: a) receive consumer data relating to the consumer from the portable electronic device carried by the consumer, the consumer data including financial account data; b) analyze the consumer data including determining whether an account associated with the financial account data has available funds that are greater than or equal to a price of the article to determine a risk level of the consumer; and c) direct the security apparatus to transition from the secured state to the unsecured state upon the consumer's risk level being approved by determining that the available funds are greater than or equal to the price of the article, wherein step c) is completed without charging the price of the article to the account.

* * * * *